US008235780B2

(12) United States Patent
Nicely

(10) Patent No.: US 8,235,780 B2

(45) Date of Patent: Aug. 7, 2012

(54) CARD GAME SYSTEM AND DEVICE HAVING SUPPLEMENTAL AWARDS BASED ON CONSECUTIVE NON-TERMINATING OUTCOMES

(75) Inventor: Mark C. Nicely, Daly City, CA (US)

(73) Assignee: IGT, Reno, NV (US)

( * ) Notice: Subject to any disclaimer, the term of this patent is extended or adjusted under 35 U.S.C. 154(b) by 1372 days.

(21) Appl. No.: 11/609,176

(22) Filed: Dec. 11, 2006

(65) Prior Publication Data

US 2007/0135193 A1 Jun. 14, 2007

Related U.S. Application Data

(60) Provisional application No. 60/748,846, filed on Dec. 9, 2005.

(51) Int. Cl.

| | |
|---|---|
| ***A63F 9/24*** | (2006.01) |
| ***A63F 13/00*** | (2006.01) |
| ***A63F 1/00*** | (2006.01) |
| ***A63F 9/20*** | (2006.01) |
| ***G06F 17/00*** | (2006.01) |
| ***G06F 19/00*** | (2011.01) |

(52) U.S. Cl. ................ 463/11; 463/13; 463/16; 463/20; 463/25; 273/292

(58) Field of Classification Search .................... 463/11, 463/13, 16, 20, 25; 273/292
See application file for complete search history.

(56) References Cited

U.S. PATENT DOCUMENTS 4,930,789 A 6/1990 Harris et al.
5,538,252 A 7/1996 Green
5,570,885 A 11/1996 Ornstein
5,718,431 A 2/1998 Ornstein
5,788,574 A 8/1998 Ornstein et al.
5,829,748 A 11/1998 Moore, Jr.
5,848,936 A 12/1998 Morrison
6,102,400 A 8/2000 Scott et al.
6,109,612 A 8/2000 Moore
6,179,711 B1 * 1/2001 Yoseloff .......................... 463/25
6,293,864 B1 9/2001 Romero
6,299,531 B1 10/2001 Bommarito
RE37,588 E 3/2002 Ornstein
6,582,302 B2 6/2003 Romero
6,585,586 B1 7/2003 Romero
6,585,588 B2 7/2003 Harti
6,659,461 B2 * 12/2003 Yoseloff et al. ............... 273/274
6,679,492 B2 1/2004 Markowiak
6,805,628 B2 10/2004 Romero
6,887,157 B2 5/2005 Lemay et al.
(Continued)

FOREIGN PATENT DOCUMENTS

EP 0840264 5/1998
(Continued)

*Primary Examiner* — Peter DungBa Vo
*Assistant Examiner* — Wei Li
(74) *Attorney, Agent, or Firm* — Neal, Gerber & Eisenberg LLP

(57) ABSTRACT

A card game includes a plurality of rounds playable upon at least one base wager and at least one supplemental wager. Each one of the rounds results in an outcome, where a base award is associated with at least one of the outcomes. A pattern condition is fulfillable when a pattern of the outcomes corresponds to one of a plurality of designated patterns. Different supplemental awards are provided based on the fulfillment of the pattern condition.

26 Claims, 34 Drawing Sheets

U.S. PATENT DOCUMENTS

| | | | | |
|---|---|---|---|---|
| 6,896,614 | B2 | 5/2005 | Romero | |
| 7,331,859 | B2 * | 2/2008 | Hornik et al. | 463/16 |
| 2001/0028147 | A1 * | 10/2001 | Ornstein et al. | 273/292 |
| 2001/0029200 | A1 | 10/2001 | Romero | |
| 2002/0002070 | A1 | 1/2002 | Romero | |
| 2002/0006820 | A1 | 1/2002 | Romero | |
| 2002/0036380 | A1 * | 3/2002 | Perrie et al. | 273/146 |
| 2002/0096827 | A1 | 7/2002 | Markowiak | |
| 2002/0137558 | A1 | 9/2002 | Hartl | |
| 2002/0155870 | A1 | 10/2002 | Romero | |
| 2003/0027626 | A1 * | 2/2003 | Marks et al. | 463/20 |
| 2003/0045344 | A1 | 3/2003 | Webb et al. | |
| 2003/0060265 | A1 * | 3/2003 | Webb | 463/20 |
| 2003/0119572 | A1 * | 6/2003 | Moody et al. | 463/13 |
| 2003/0199312 | A1 | 10/2003 | Walker et al. | |
| 2003/0207706 | A1 * | 11/2003 | Potter et al. | 463/16 |
| 2003/0218303 | A1 * | 11/2003 | Walker et al. | 273/292 |
| 2003/0236115 | A1 | 12/2003 | Chamberlain | |
| 2004/0053666 | A1 | 3/2004 | Vancura | |
| 2004/0067790 | A1 | 4/2004 | Peterson et al. | |
| 2004/0082372 | A1 | 4/2004 | Romero | |
| 2004/0116179 | A1 * | 6/2004 | Nicely et al. | 463/25 |
| 2004/0147311 | A1 | 7/2004 | Fujimoto | |
| 2004/0171415 | A1 | 9/2004 | Webb et al. | |
| 2005/0181854 | A1 | 8/2005 | Moshal | |
| 2006/0068872 | A1 | 3/2006 | Walker et al. | |
| 2006/0068899 | A1 | 3/2006 | White et al. | |
| 2006/0084501 | A1 | 4/2006 | Walker et al. | |
| 2006/0089188 | A1 | 4/2006 | Romero | |
| 2006/0252482 | A1 | 11/2006 | Walker et al. | |

FOREIGN PATENT DOCUMENTS

| | | |
|---|---|---|
| EP | 1434179 | 6/2004 |
| WO | 96/29685 | 9/1996 |
| WO | 01/76703 | 10/2001 |
| WO | 01/83056 | 11/2001 |
| WO | 03/068349 | 8/2003 |
| WO | 03/083795 | 9/2003 |

* cited by examiner

CARD GAME SYSTEM AND DEVICE HAVING SUPPLEMENTAL AWARDS BASED ON CONSECUTIVE NON-TERMINATING OUTCOMES

PRIORITY CLAIM

This application claims priority to and the benefit of U.S. Provisional Patent Application No. 60/748,846, filed on Dec. 9, 2005, the entire disclosure of which is hereby incorporated by reference.

CROSS REFERENCE TO RELATED APPLICATIONS

The present application relates to the following commonly-owned pending patent application: U.S. patent application No. 11/609,177, filed on Dec. 11, 2006.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

There are a variety of games to play in casinos and other gaming environments. In one known card game, the player can receive an extra award if the player has a streak of winnings in back-to-back plays. There is a need to increase the level of interest, excitement and intrigue associated with streak features of card-related games. There is also a need to provide improvements to, and interesting variations of, card-related games.

SUMMARY

The embodiments of the present disclosure provide a card game system that includes a base wager and a supplemental wager, where the supplemental wager is usable over a plurality of rounds of the card game. Each of the rounds of play results in an outcome. The outcome may be a winning outcome, a losing outcome, a tying outcome, a terminating outcome, a non-terminating outcome, or any other suitable designated outcome. The card game system includes a base award associated with at least one of the outcomes.

In an embodiment, the card game system also includes a pattern or streak condition that can be fulfilled when a pattern or streak of the outcomes corresponds to a designated pattern or streak. The game system provides one or more supplemental awards upon the fulfillment of the pattern condition. In certain embodiments, the pattern or streak condition can be a number of consecutive wins of the game or a number of consecutive non-terminating outcomes of the game. In an embodiment, the game system determines a first supplemental award when a first one of the rounds results in the fulfillment of the pattern or streak condition, where the first supplemental award is based on the supplemental wager. Also, the game system determines a second supplemental award when a second one of the rounds results in the fulfillment of the pattern or streak condition. The second supplemental award is also based on the supplemental wager. It should be appreciated that this process can continue from round to round beyond just a first and second round.

The game system gaming device described further below provides a plurality of advantageous technical effects. One such technical effect relates to the structure and function of the conveyor assembly for use in the supplemental round of play.

Additional features and advantages are described herein, and will be apparent from, the following Detailed Description and the figures.

DETAILED DESCRIPTION

Card Game System

Figure 1:
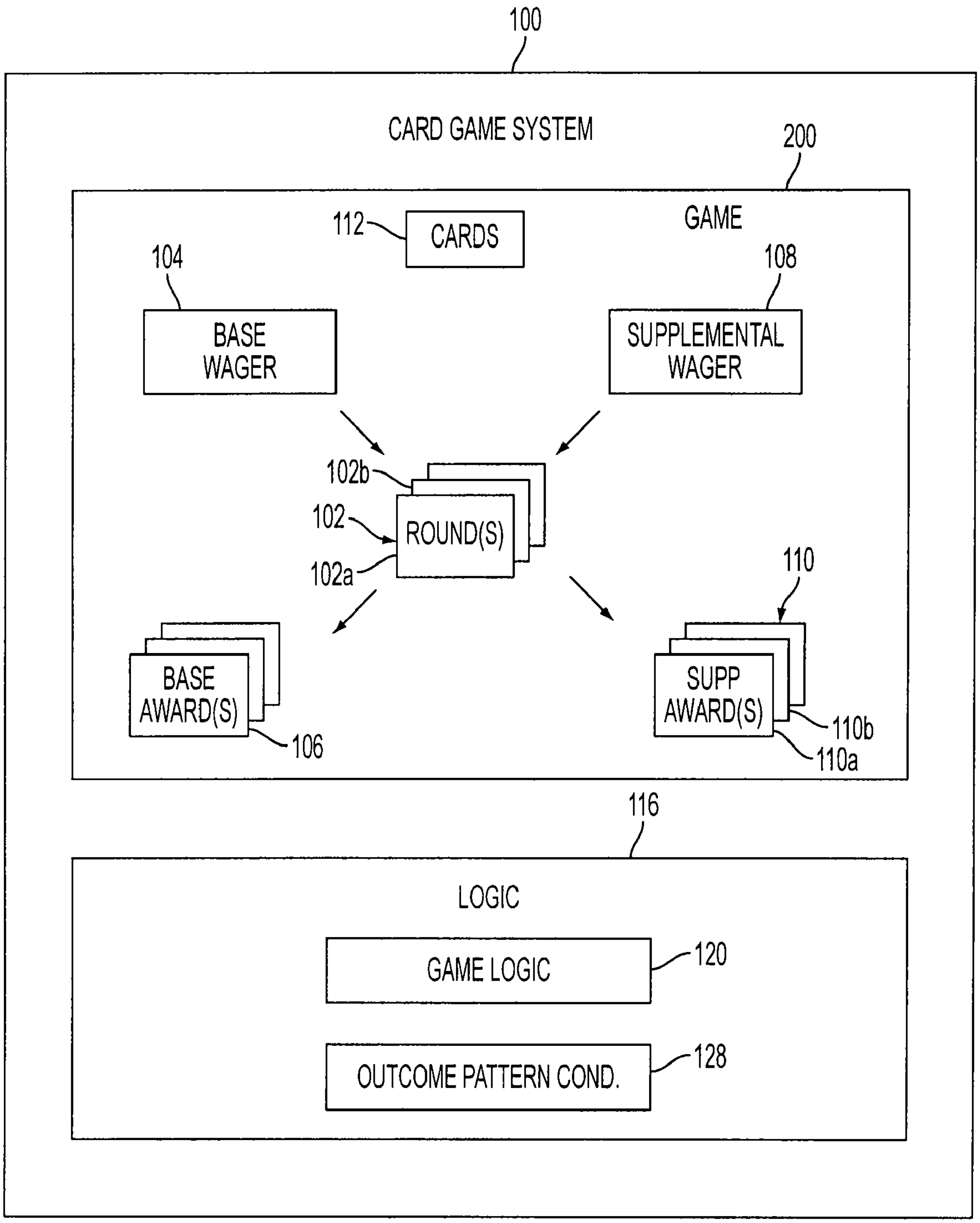
FIG. 1 is a schematic diagram of the game system according to an embodiment.

As illustrated in FIG. 1, in an embodiment, a card game system 100 is provided. The card game system 100 includes a card game 200 and logic 116. The card game 200 includes a primary or base wager 104, an optional streak or supplemental wager 108, and a plurality of cards 112 for use in the card game 200. At least one base wager 104 and at least one supplemental wager 108 are applied to a plurality of rounds 102 of play of the card game 200. Based on the outcomes of the rounds, one or more base awards 106 and one or supplemental awards 110 may be provided to the player. The logic 116 includes base game logic 120 and at least one outcome pattern or streak condition 128. In one embodiment where the card game 200 is a Blackjack game, the base game logic 120 is conventional Blackjack logic, as described in detail below.

In an embodiment, one or more designated wagering rules or protocols apply to the card game 200 to restrict the amount of the supplemental wagers. For example, where the card game 200 is a Blackjack game, the designated wagering rules can restrict the value of any supplemental wagers to be equal to the value of the base game wagers. In another example, the designated wagering rules may restrict the supplemental wager to be a value which is: (a) greater than or equal to a minimum supplemental wager limit; (b) less than or equal to a maximum supplemental wager limit; or (c) equal to a combination thereof.

In an embodiment, if one or more supplemental wagers 108 have been placed at any point in one or more previous plays 102 of the card game 200 and at least one pattern or streak condition 128 is fulfilled, one or more supplemental awards 110*a* and 110*b* are provided to the player based on one or more supplemental wagers 108. For example, in one round or play 102*a* of the card game 200, if the pattern condition 128 is fulfilled and a supplemental wager 108 was placed in a previous round 102, the system 100 provides a supplemental award 110*a* to the player for the player's immediate use as reflected in a total amount of player credits. The supplemental award 110*a* is based on the supplemental wager 108. If the next play 102*b* of the card game 200 continues the fulfillment of the pattern or streak condition 128, the system 100 designates and provides another supplemental award 110*b* for the player. The supplemental award 110*b* is based on the same supplemental wager 108. Accordingly, the player has the opportunity to receive a plurality of supplemental awards 110*a* and 110*b* based on a single previously placed supplemental wager 108, where the supplemental wager 108 remains active from round of play to round of play absent a terminating outcome in the card game 200.

In one embodiment, the card game system 100 prevents the player from placing more than one supplemental wager on subsequent rounds 102 until a first supplemental wager has been lost or otherwise withdrawn. That is, the first supplemental wager persists over a number of rounds 102 until the streak ends. Only then does the card game system 100 allow the player to place another supplemental or streak wager. In other embodiments, as described below, more than one supplemental wager can be active at a given point a single play of the card game 200. In another embodiment, at least one supplemental wager is required to be placed or active for every game. In another embodiment, a supplemental wager is required to be placed for every active game.

In an embodiment, the pattern or streak condition 128 is a number or quantity of consecutive wins of the card game 200. In another embodiment, the pattern or streak condition 128 is a pattern of consecutive designated, different, or identical outcomes of the card game 200. In this embodiment, the designated outcomes can include, but are not limited to: (a) a win; (b) a win or a loss associated with a play of the game where the player has doubled-down on the player hand; and (c) a win of at least half of the resultant plurality of player hands when the player splits the cards in the player hand. In one example, an uninterrupted chain on wins fulfills the pattern condition 128. In another example, an interrupted chain of wins (such as win-win-loss-win) fulfills the pattern condition 128.

Figure 2:
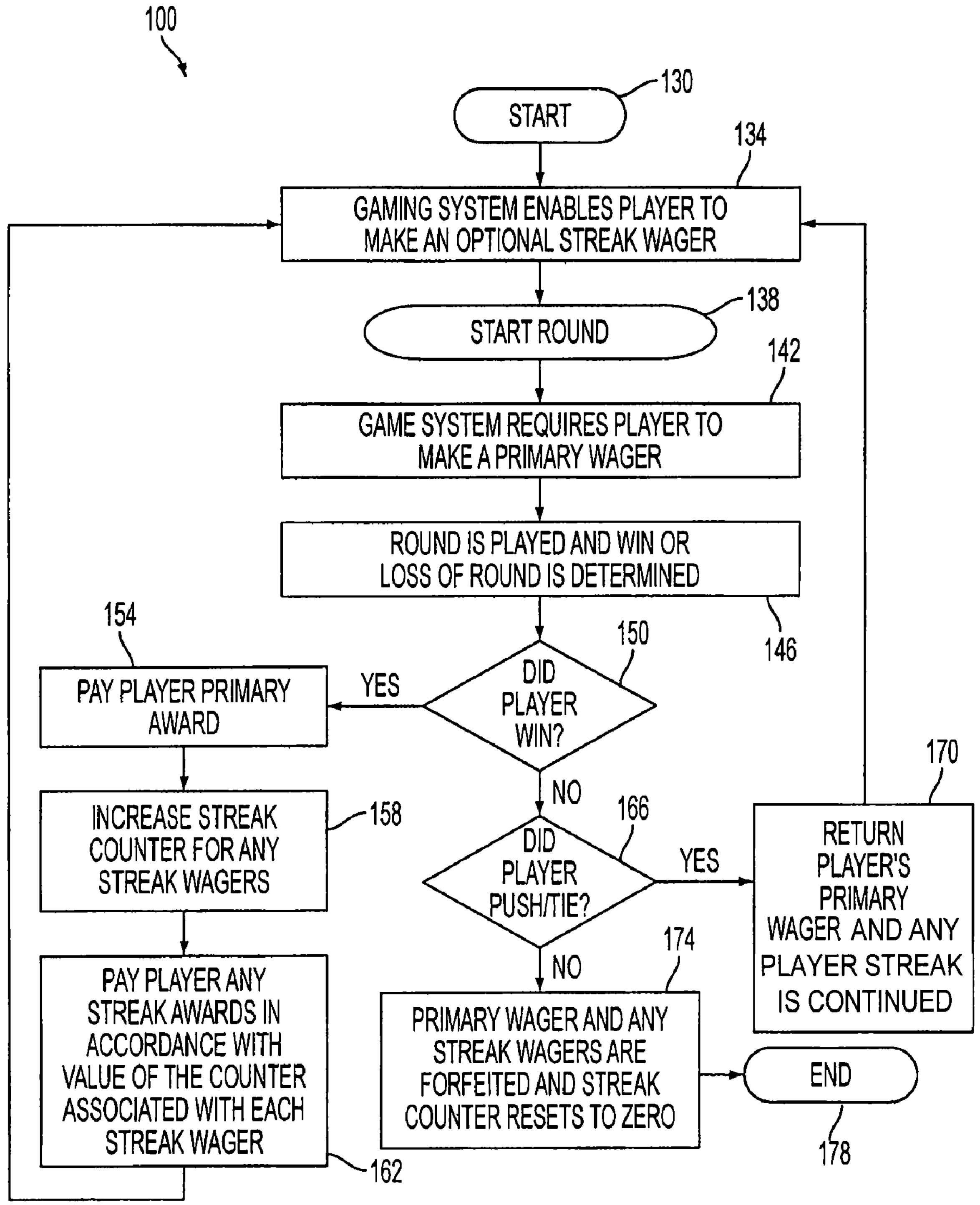
FIG. 2 is a flow diagram of the operation of one embodiment of the game system.

FIG. 2 illustrates a general overview of the operation of one example of one embodiment of the card game system 100. The game system 100 enables the game to be initiated, as indicated in step 130. The card game system 100 enables a player to make an optional supplemental wager, as indicated by block 134. The system initiates a round of play of the game as indicated in step 138. The system enables or requires the player to make a game wager on the game, as indicated in block 142. The game is played, and the card game system 100 determines whether the player has won or lost or tied the game, as indicated in block 146.

If the player has won the play or round of the game, the card game system 100 provides the player with a game award, as indicated in step 154. The card game system 100 increases a streak counter or otherwise tracks the information regarding the number of wins of the rounds associated with each application of the same supplemental wager, as indicated in step 158. The card game system 100 pays the player any supplemental awards associated with the tracked values associated with each of the supplemental wagers, as indicated in step 162. The game system then enables the player to make another optional supplemental wager and starts a new round of play of the game, as indicated in steps 134 and 138.

If the player did not win the play of the game, the game system must determine whether the player tied the dealer on the play of the game, as indicated by decision diamonds 150 and 166. If the player did not tie the dealer, then the player has lost the play of the game. Any streak or supplemental wagers are forfeited and the streak is ended, as indicated in step 174. The game ends, as indicated in step 178.

If the player tied the dealer in the play of the game, the dealer returns the player's game wager, and any streak or supplemental wagers maintain their standing as indicated in step 170. The game system then enables the player to make another optional supplemental wager and starts a new round of play of the game, as indicated in steps 134 and 138. In one embodiment, in the case where an initial streak or supplemental wager was placed and the subsequent round led the player tying the dealer, the player is permitted to remove or modify said initial streak or supplemental wager. It should be appreciated that in other embodiments, an additional supplemental wager may not be placed until after a terminating outcome in the game occurs with respect to the first supplemental wager.

In the case where the player is permitted to a split the player's initial hand into two or more separate hands according to standard or modified rules of Blackjack, the corresponding impact or result on any supplemental wager can be defined. In one embodiment, such result is as follows: (a) the streak is advanced if all of the split hands beat the dealer hand; (b) the streak is ended and all supplemental wagers forfeited if all of the split hands lose to the dealer; and (c) the streak is continued but otherwise not advanced for all other combinations of split hand outcomes. In an alternate embodiment, such result is as follows: (a) the streak hand is ended and all supplemental wagers forfeited if all of the split hands lose to the dealer; (b) the streak is continued but otherwise not advanced if all of the split hands tie the dealer; and (c) otherwise, the streak wagers advance once for each winning split hand. In one embodiment, such result is as follows: (a) the streak is advanced if more of the split hands beat the dealer hand than lose to the dealer hand; (b) the streak is ended and all supplemental wagers forfeited if more of the split hands lose to the dealer than win to the dealer hand; and (c) the streak is continued but otherwise not advanced for all other combinations of split hand outcomes. In another embodiment, each of the split hands is evaluated in turn and the outcome of each hand independently affects any active streak. For example, if the first of two split hands is a loss against the dealer, then the streak is ended and all supplemental wagered forfeited, and the player is not permitted to place a new streak wager until the next round. In another embodiment, active streaks are temporarily suspended, and their status maintained, whenever a player elects to split the player's hand. In such an embodiment, the base game wager may be restricted to be: (a) equal to the largest active streak wager; or (b) greater than the largest active streak wager. In another embodiment, active streaks are temporarily suspended, and their status maintained, whenever a player elects to double-down. In such an embodiment, the base game wager may be restricted to be: (a) equal to the largest active streak wager; or (b) greater than or equal to the largest active streak wager.

In one embodiment, the player may be able to earn one or more anti-terminators, where the redemption of one such anti-terminator enables the player to continue a streak that would normally otherwise terminate. In one embodiment, streak wager size limitations are required for anti-terminator granting or redemption. In one embodiment, the player is limited to the number of anti-terminators that the player can hold. In one embodiment, the player is awarded an anti-terminator when the following conditions are present: (a) the player has one or more qualified streak bets in play; (b) the player has a Blackjack (initial two player cards representing a value of twenty-one) and; (c) the dealer does not have a Blackjack (initial two dealer cards representing a value of twenty-one.) In one embodiment, the player may forfeit one anti-terminator for each wager that has progressed to the highest-most stage of the streak. In one embodiment, the player may forfeit all anti-terminators when any wager reaches the highest-most stage of the streak.

In one embodiment, when the player has a Blackjack and the dealer does not have a Blackjack, streak wagers may be evaluated differently than for a standard player win. In one embodiment, when the player has a Blackjack and the dealer does not have a Blackjack, any streak awards may be paid at a higher award multiplier than for a standard player win. In another embodiment, when the player has a Blackjack and the dealer does not have a Blackjack, all streak wagers may advance two steps instead of the usual single step for a standard player win.

Figure 3A:
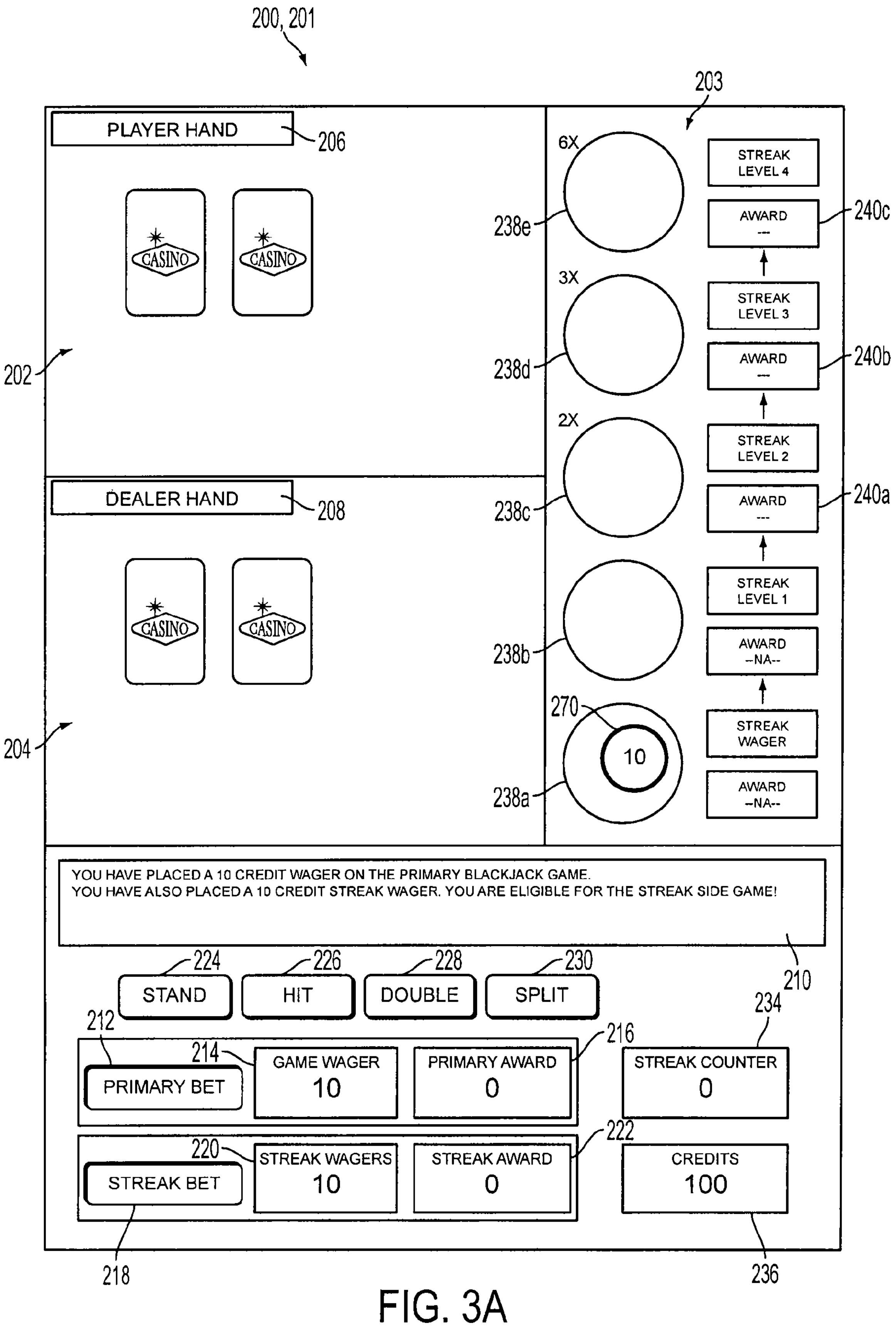
FIGS. 3A, 3B, 3C and 3D are top views of an example first round of one embodiment of the primary Blackjack game, where the player places a supplemental wager.

Referring to FIGS. 3A through 9B, the layout of one example of the card game shows the player position and cards on top of or above the dealer position and cards. It should be appreciated that the card game of the system can specify any suitable alternative orientation for the player and dealer position, such as the dealer position and cards being on top of or above the player position and cards. FIG. 3A, in an embodiment, a game system is provided for playing a Blackjack game 200 having a play 201 including a primary wager and a supplemental wager. In the example illustrated in FIG. 3A, the dealer deals a play 201 of a Blackjack game 200 to a player. As described further below, the game 200 can be implemented in a variety of embodiments, including, but not limited to: (a) a table-play embodiment in which the cards are in paper form dealt on a table by a human dealer; (b) a computerized embodiment in which the cards are displayed in virtual form on an electronic display device, where a processor performs the dealer functions; (c) a table play embodiment in which the cards are in paper form dealt on a table by a human game administrator on a table with electronic or electromechanical aids, such as card tracking technology connected to a processor that can determine, track and display streak sequence status; (d) bet handling mechanisms as detailed below; or (e) any suitable combination of the foregoing. In the example illustrated in FIG. 3A, a play 201 of the game 200 includes a player hand 206 and a dealer hand 208, and such play is played according to conventional Blackjack logic. In one embodiment, the game 200 includes a player area 202; a dealer area 204; a streak area 203; a message area 210; a player hand 206; dealer hand 208; a primary wager message area 214; a primary award area 216; a streak wager message area 220; and a streak wager award area 222. In addition, several player inputs are provided for use during a play 201 of the game 200. These inputs include, but are not limited to: a primary wager input 212; a streak wager input 218; a stand input 224; a hit input 226; as specific Blackjack game rules allow, a double-down input 228; and a split input 230. The player hand 206 is played in the player area 202. Similarly, the dealer hand 208 is played in the dealer area 204. As described above, the player area 202 can be under or below the dealer area 204 depending upon the embodiment.

In the example play of the game 200 illustrated in FIG. 3A, the player makes a primary wager by inputting the wager amount with the primary wager input 212. In this example, the player places a base or primary wager of ten credits as indicated in the primary wager area 214, and as indicated in the general message area 210. Also in this play 201 of the game 200, the player places a supplemental wager of ten credits by activating the streak input 218. This streak wager is indicated in the streak wager area 220 and also in the general message area 210.

Also, a first streak wager 270 of ten credits appears in the streak wager area 238*a* of the streak area 203. It should be appreciated that at this point in the game, the first streak wager 270 is simply a wager and does not reflect an active streak. This is because, in this example, the streak condition requires one or more successful or otherwise qualifying outcomes, and the player has not yet played any plays 201 of the game 200 subsequent to placing the streak wager. Streak wager area 238*b* is a placeholder for any streak wager that is at a streak level of one. Similarly, streak wager area 238*c* is a placeholder for any streak wager that is at a streak level of two, streak wager area 238*d* is a placeholder for any streak wager that is at a streak level of three, and streak wager area 238*d* is a placeholder for any streak wager that is at a streak level of four. Although four streak levels are described in this embodiment, it should be appreciated that any suitable number of streak levels may be provided.

Figure 3B:
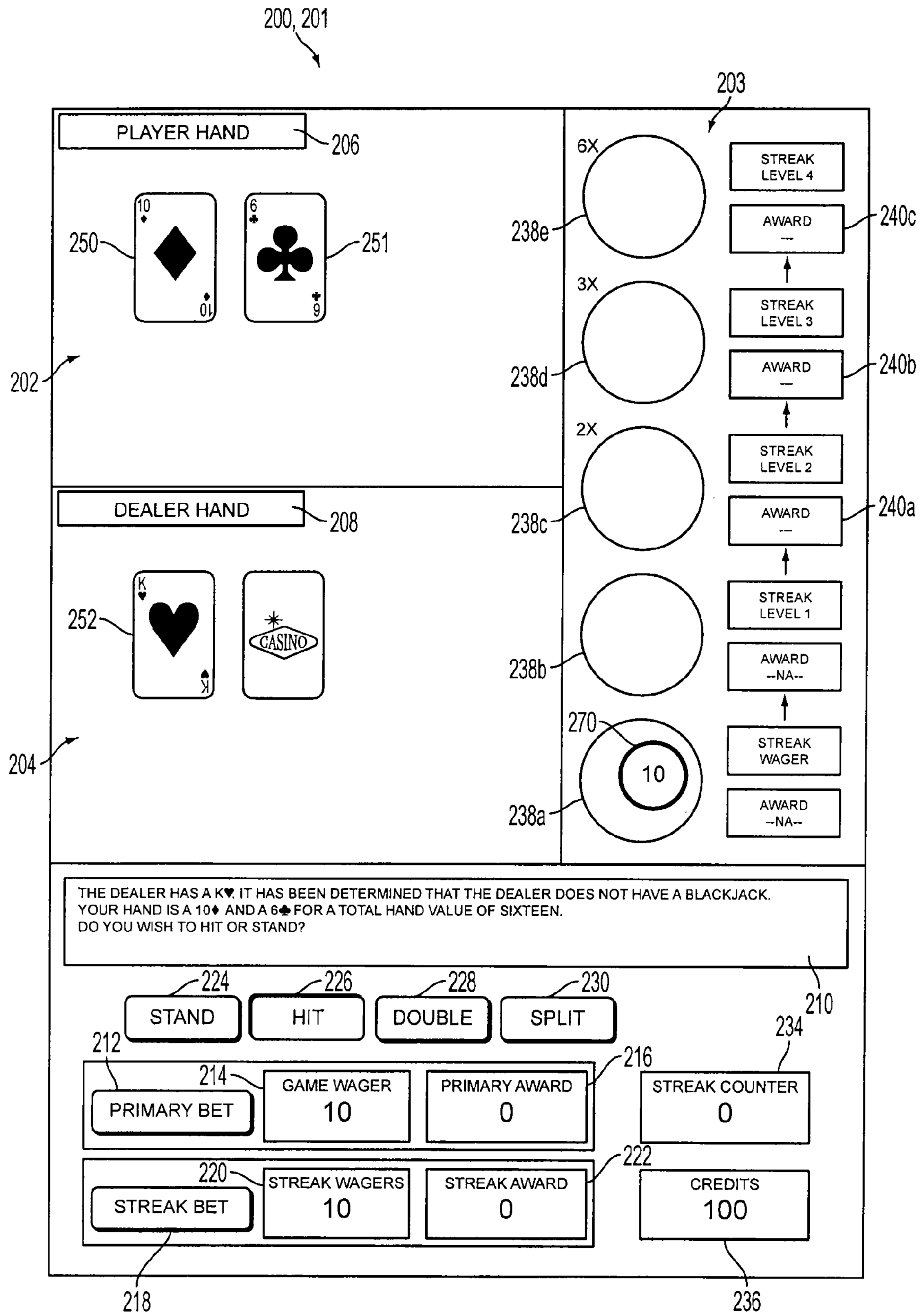

Referring to FIG. 3A, the dealer deals two cards face-down to the player to form an initial player hand 206. Similarly, the dealer deals two cards in the dealer area 204 to form an initial dealer hand 208. The cards may be dealt face-down or may be dealt with the player cards face-up as in a conventional Blackjack fashion. Referring to FIG. 3B, a first card 250 and a second card 251 are revealed in the player hand 206. The first card 250 is a ten of diamonds (10♦) and the second card 251 is the six of clubs (6♣). In the dealer hand 208, one card 252 is revealed as the dealer's face-up card, and is a King of hearts (K♥). At this point, the player is able to hit, stand, and, based upon the selected Blackjack rules, double-down, or otherwise modify the player hand 206. However, in this example, because the dealer has a ten-value card as the face-up card, and according to the selected Blackjack rules in this embodiment, it must first be determined whether the dealer hand 208 is a Blackjack. In this example, the dealer determines that the dealer hand 208 is not a Blackjack, as indicated in the message area 210. In another embodiment, the selected Blackjack rules may require the dealer to not examine the dealer's face-down card until after all player hands are resolved, as is the standard rule in European Blackjack. As mentioned above, the player hand 206 includes a ten of diamonds and a six of clubs (10♦ 6♣) for a total hand value of sixteen, as indicated in the message area 210. After it has been determined that the dealer hand 208 is not a Blackjack hand, the player must determine whether to hit or stand or double-down. In this example, the player determines to hit by activating the hit input 226.

Figure 3C:
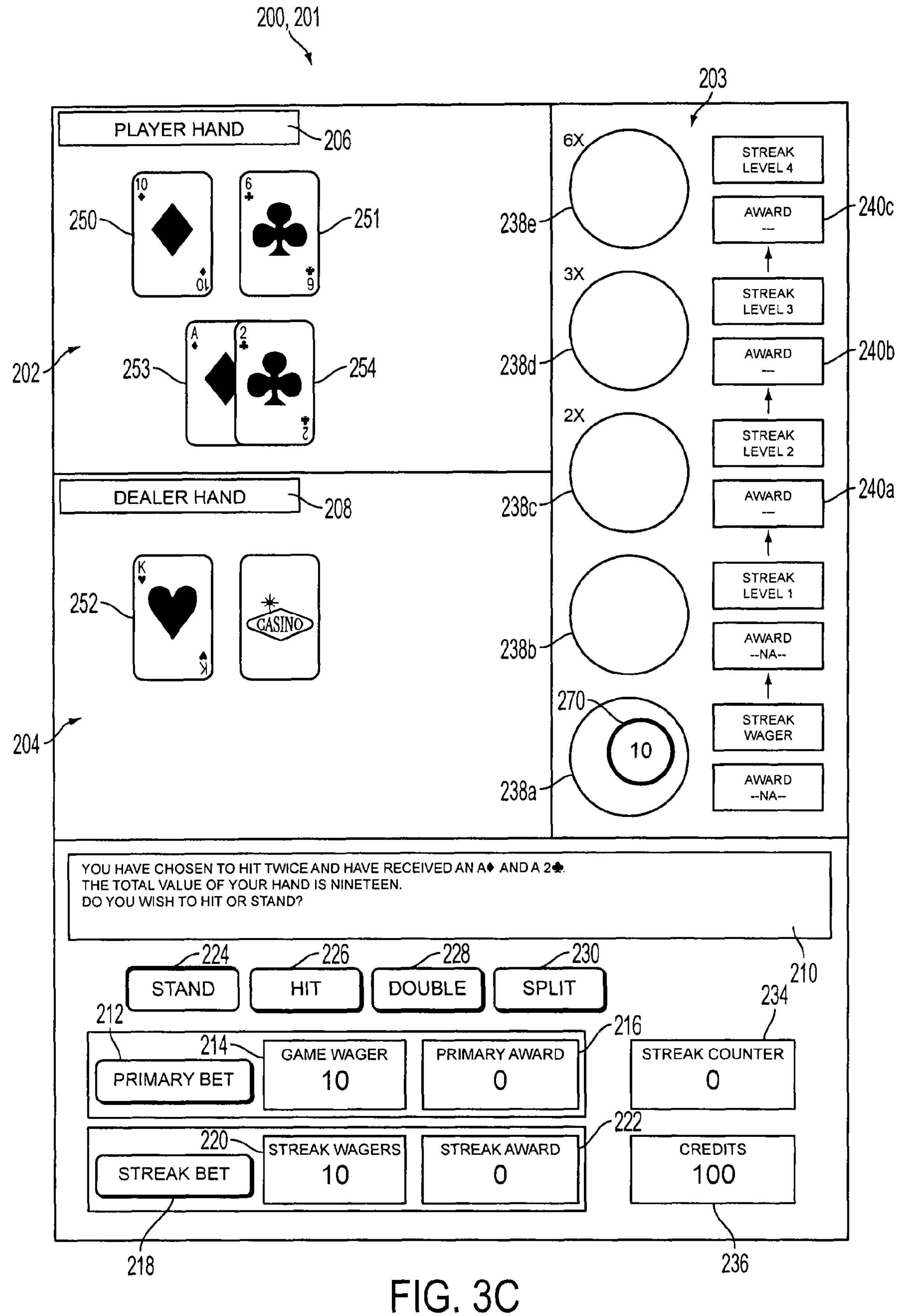

As illustrated in FIG. 3C, the player has hit a first card 253 that is an Ace of diamonds (A♦), and also chose to hit a second time and received a second card 254 that is a two of clubs (2♣). The total value of the player hand 206 is now at nineteen. The player must now determine whether to hit again or to stand as indicated in the message area 210. In this example, the player chooses to stand by activating the stand input 224.

Figure 3D:
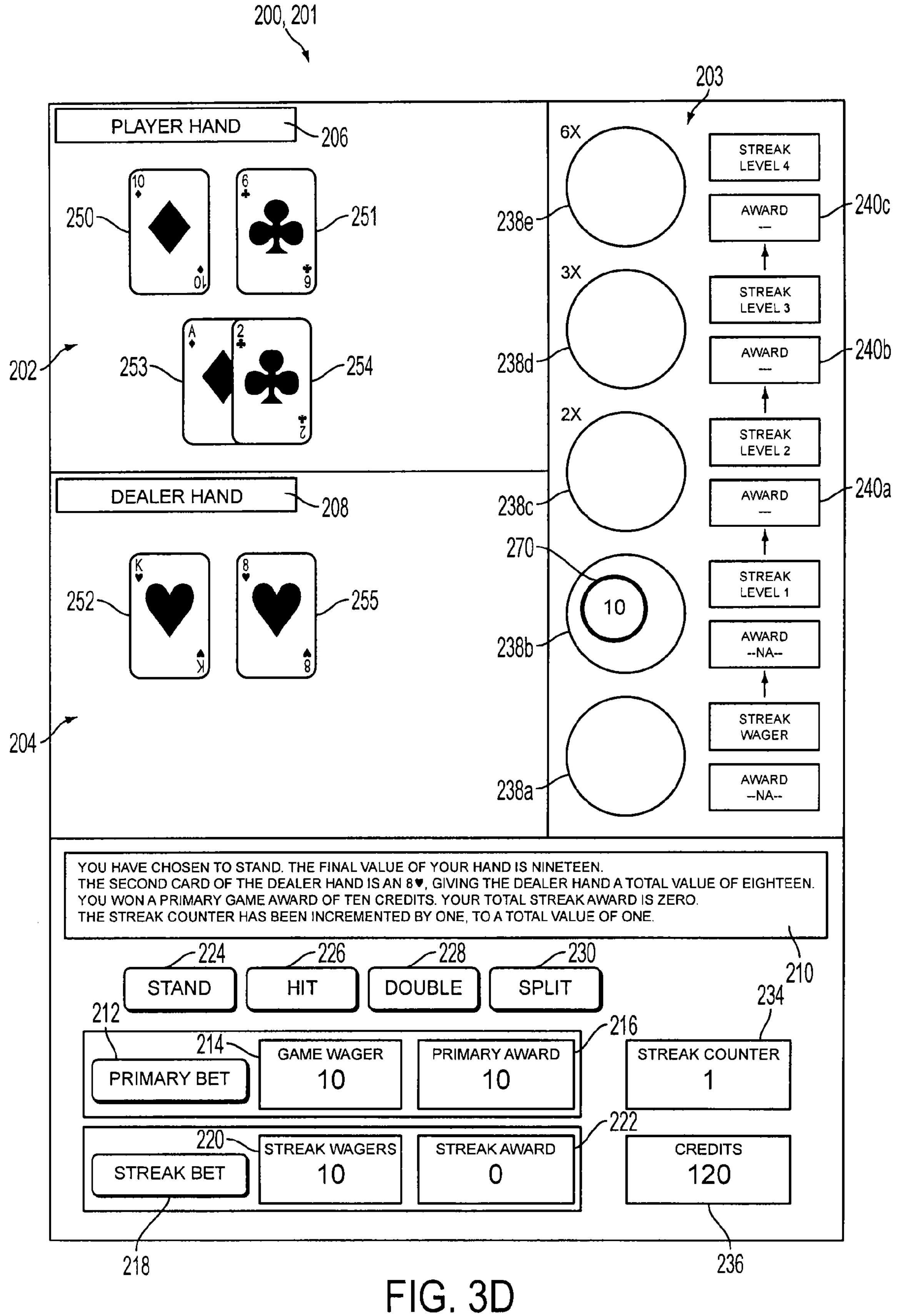

As illustrated in FIG. 3D, the player has chosen to stand and a final value of the player's hand 206 is nineteen. The second dealer card 255 or face-down card of the dealer hand 208 is now revealed to be an eight of hearts (8♥), getting the dealer hand 208 with a total value of eighteen. According to conventional Blackjack logic, the dealer is required to hit until the value of the dealer hand 208 is at least seventeen. However, when the dealer hand 208 exceeds or meets a value of seventeen, the dealer is required to stand. In this example, because the dealer hand has a total value of eighteen, the dealer must stand. The final value of the player hand 206 exceeds the final value of the dealer hand 208, thus the player wins this first round of play 201.

Referring to FIG. 3D, the first streak wager 270 is advanced from the streak wager area 238*a* to the streak wager area 238*b*, where streak wager area 238*b* corresponds to a streak level of one. A streak level of one indicates that a player has won one round of play. Similarly, a streak level of two indicates that a player has won two consecutive rounds of play, a streak level of three indicates that a player has won three consecutive rounds of play, and a streak level of four indicates that a player has won four consecutive rounds of play. In this embodiment, a player does not receive a streak award unless the streak level is two or greater. Thus, in this example, there is no streak award, as indicated in the streak wager award area. However, because the player won the player hand 206, the player wins a primary award of ten credits as indicated in the primary award area 216 and as indicated in message area 210. The dealer provides the player with the primary award of ten credits and also returns the player's primary wager of ten credits, thus the credits display 236 is updated to a total of 120 credits. Also, in this embodiment the card game system 100 includes a streak counter display 234, as described above. Because the player won the first hand, the streak counter display 234 is incremented to a total value of one, as also indicated in message area 210. This completes the first play 201 of the Blackjack game and the streak remains active.

Figure 4A:
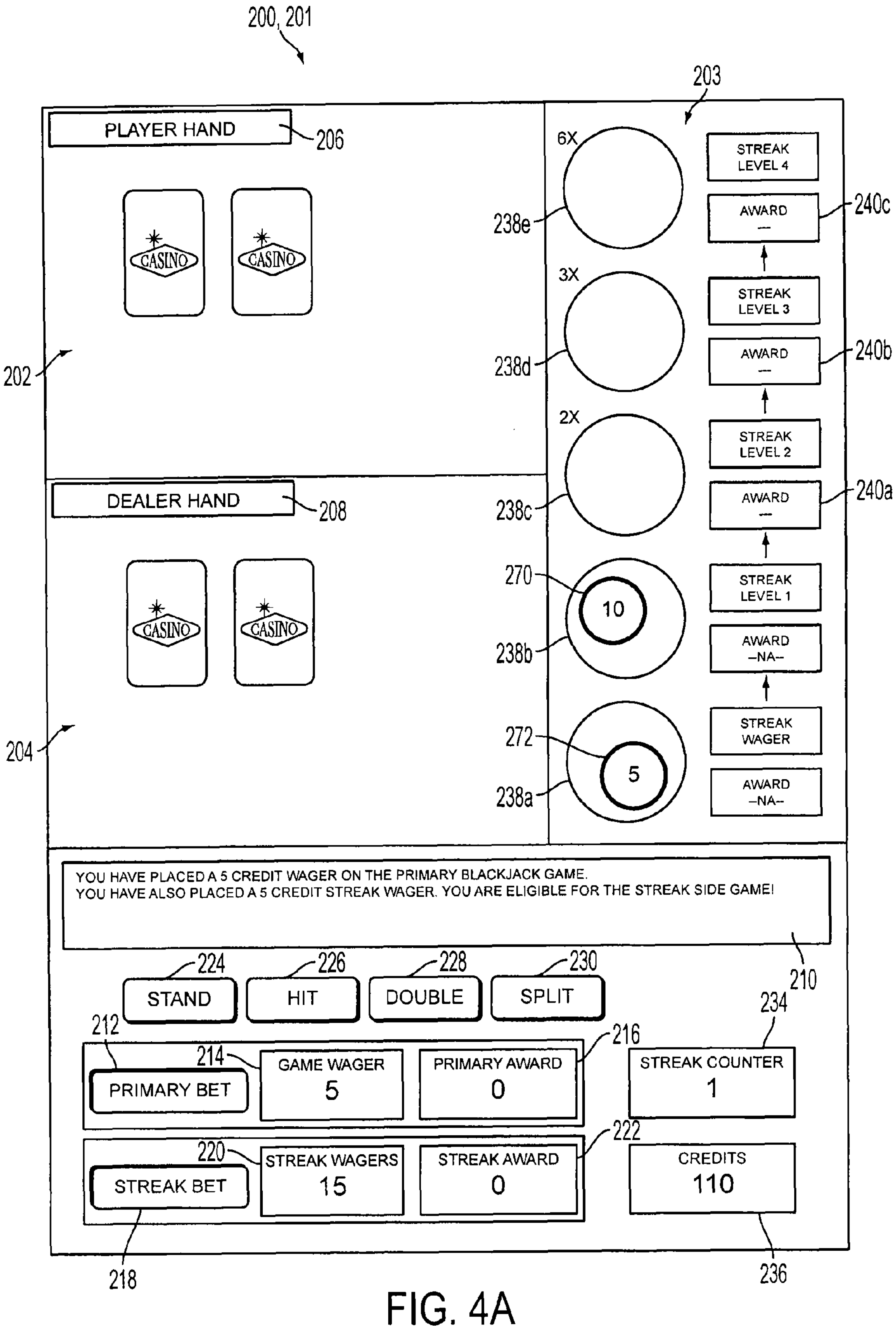
FIGS. 4A, 4B and 4C are top views of an example second round of one embodiment of the primary Blackjack game, where the player places another supplemental wager.

As illustrated in FIG. 4A, a new round of a play of the game is started. In the example play of the game 200 illustrated in FIG. 4A, the player makes a primary wager by inputting the wager amount with the primary wager input 212. In this example, the player places a base or primary wager of five credits as indicated in the primary wager area 214, and as indicated in the general message area 210. Also in this play 201 of the game 200, the player places a supplemental wager of five credits by activating the streak input 218. Although in this embodiment a new separate supplemental or streak wager may be placed on each successive play of the game, it should be appreciated that in another embodiment, a streak wager must first be resolved or forfeited prior to enabling a player to place another streak wager.

Referring to FIG. 4A, this second streak wager is indicated in the general message area 210. Also, the cumulative value of this second streak wager 272 and the first streak wager 270 (i.e., fifteen credits) is indicated in the total streak wager area 220. Also, the second streak wager 272 of five credits appears in the streak wager area 238*a* of the streak area 203. As mentioned above, the second streak wager 272 in streak wager area 238*a* is simply a wager at this point and does not reflect an active streak, as this point. However, the previous first streak wager 270 is an active streak, and is at streak level one (i.e., there has been one winning outcome or designated outcome since the wager was placed). Referring to FIG. 4A, the dealer deals two cards face-down to the player to form an initial player hand 206. Similarly, the dealer deals two cards in the dealer area 204 to form an initial dealer hand 208. The cards may be dealt face-down or may be dealt with the player cards face-up as in a conventional Blackjack fashion.

Figure 4B:
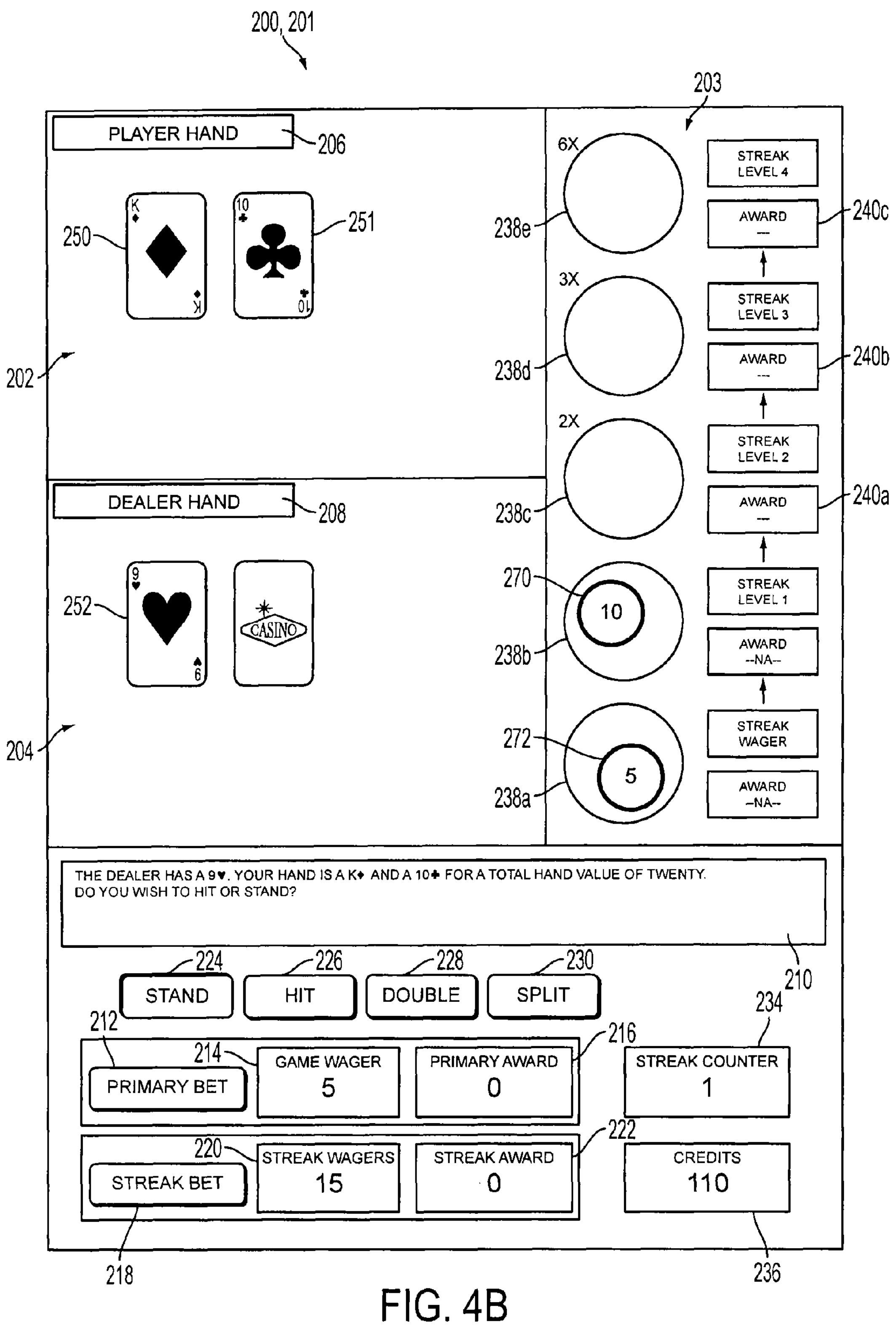

Referring to FIG. 4B, a first card 250 and a second card 251 are revealed in the player hand 206. The first card 250 is a King of diamonds (K♦) and the second card 251 is the ten of clubs (10♣). In the dealer hand 208, one card 252 is revealed as the dealer's face-up card, and is a nine of hearts (9♥). At this point, the player is able to hit, stand, double-down, or otherwise modify the player hand 206 according to conventional Blackjack logic. The player hand 206 includes the King of diamonds and the ten of clubs (K♦ 10♣) for a total hand value of twenty, as indicated in the message area 210. After it has been determined that the dealer hand 208 is not a Blackjack hand, the player must determine whether to hit or stand. In this example, the player chooses to stand by activating the stand input 224.

Figure 4C:
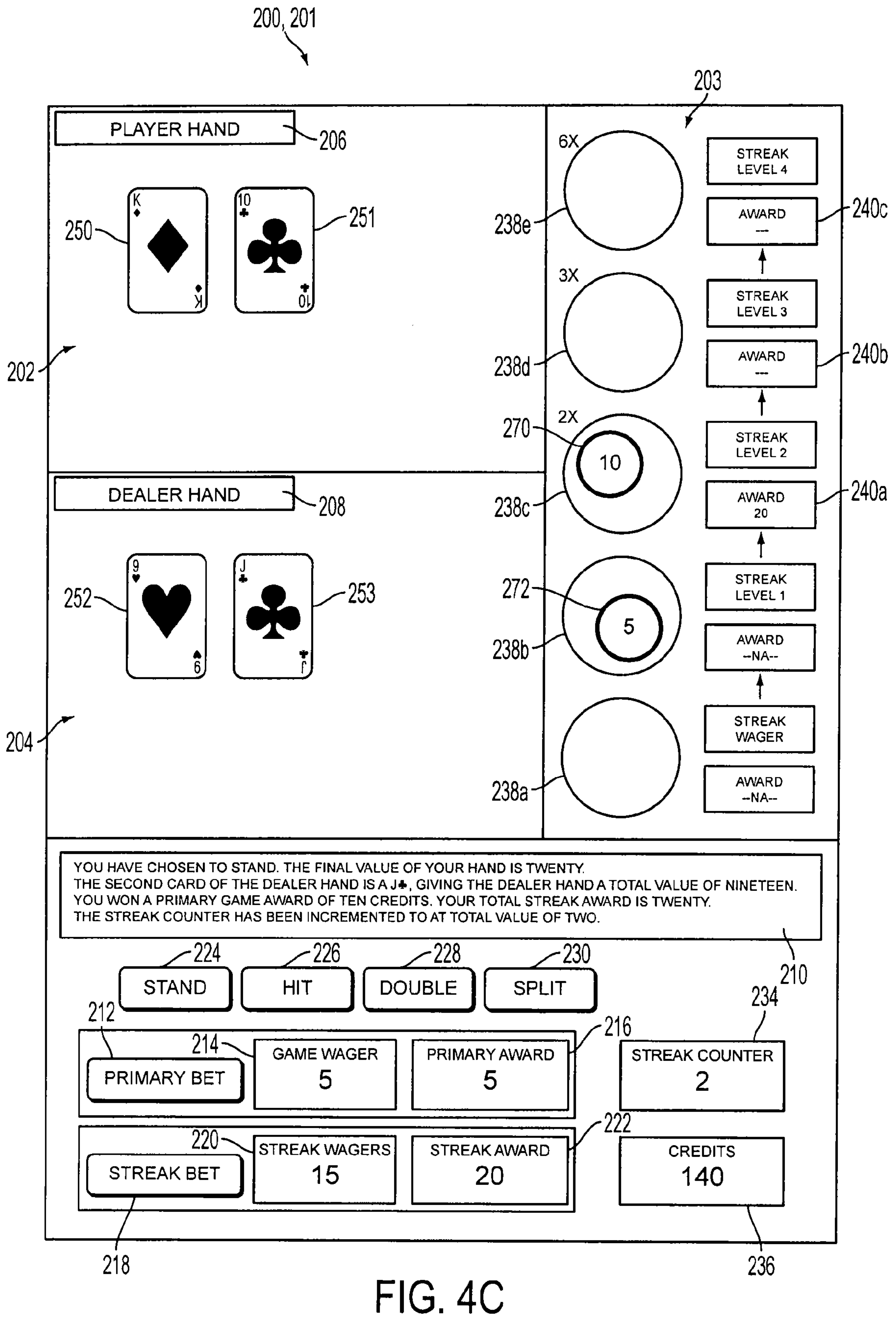

As illustrated in FIG. 4C, the player has chosen to stand and a final value of the player's hand 206 is twenty. The second card 253 or face-down card of the dealer hand 208 is revealed to be a Jack of clubs (J♣), resulting in a final dealer hand 208 having a total value of nineteen. As mentioned above, the dealer is required to hit until the value of the dealer hand 208 is at least seventeen. However, when the dealer hand 208 exceeds or meets a value of seventeen, the dealer is required to stand. In this example, because the dealer hand has a total value of nineteen, the dealer must stand. The final value of the player hand 206 exceeds the final value of the dealer hand 208, thus the player wins this second round of play 201.

Because the player has won the second round of play 201, the streak wagers 270 and 272 are advanced in the streak area 203 to the next streak levels. It should be appreciated that in this example, each streak wager 270 and 272 was placed on a different round of a play 201. Thus, in a given streak, each of these secondary or streak wagers will be at a different streak level because the numbers of consecutive wins or qualifying outcomes since the wager was placed will be different for each wager.

In an embodiment, in a given round of play 201 of the game 200, there may be one or more outcomes where the outcome pattern or streak condition is neither terminated nor advanced (i.e., suspended), as described in further detail below. In one example, if the player hand 206 ties or pushes with the dealer hand 208, the streak condition is suspended for the current round of play 201. In an embodiment, if a player had placed a secondary or streak wager on one round 102*a* of play 201 of the game 200 and the streak condition had been suspended due to a push, the card game system 100 returns or refunds the supplemental wager to the player. In one embodiment, such initial secondary or streak wager is left on the initial secondary or streak wager location and the player is permitted to maintain, remove or increase such initial secondary or streak wager. Upon the next round 102*b*, in accordance with any wagering restrictions or rules.

Referring again to FIG. 4C, the first streak wager 270 is advanced from the streak wager area 238*b* to the streak wager area 238*c*, where streak wager area 238*c* corresponds to a streak level of two. Also, the second streak wager 272 is advanced from the streak wager area 238*a* to streak wager area 238*b*, which corresponds to a streak level of one. As mentioned above, in this embodiment, there is no streak award associated with a streak level of one. Thus, there is no streak award associated with the second streak wager 272. However, for streak level two, a secondary or streak award is provided that is equal to 2× the amount of the streak wager 270. Therefore, in this round of play or round 201 of the game 200, a secondary or streak award of twenty credits is funded to the player's credit account, as indicated in streak award area 240*a*. Therefore, the streak award is immediately available for use to the player in subsequent rounds or plays 201. The total streak award, which is also twenty credits in this example, is indicated in the total streak award area 222. The game system 100 funds the streak or supplemental awards to the player's account and updates the total credit balance such that the supplemental awards are immediately available for use by the player. Therefore, the player can choose or elect to use these funds provided by the supplemental award as a primary wager or supplemental wager in the next round of the card game 200.

Also, because the player won the play 201 of the game 200, the player wins a primary award of five credits as indicated in the primary award area 216, and as indicated in the general message area 210. The dealer provides the player with the primary award of five credits and also returns the player's primary wager of five credits, thus the credits display 236 is updated to a total of on one-hundred forty credits. Also, the streak counter display 234 is incremented to a total value of two, as also indicated in message area 210. This completes the second play 201 of the Blackjack game and the streak is still active.

Figure 5A:
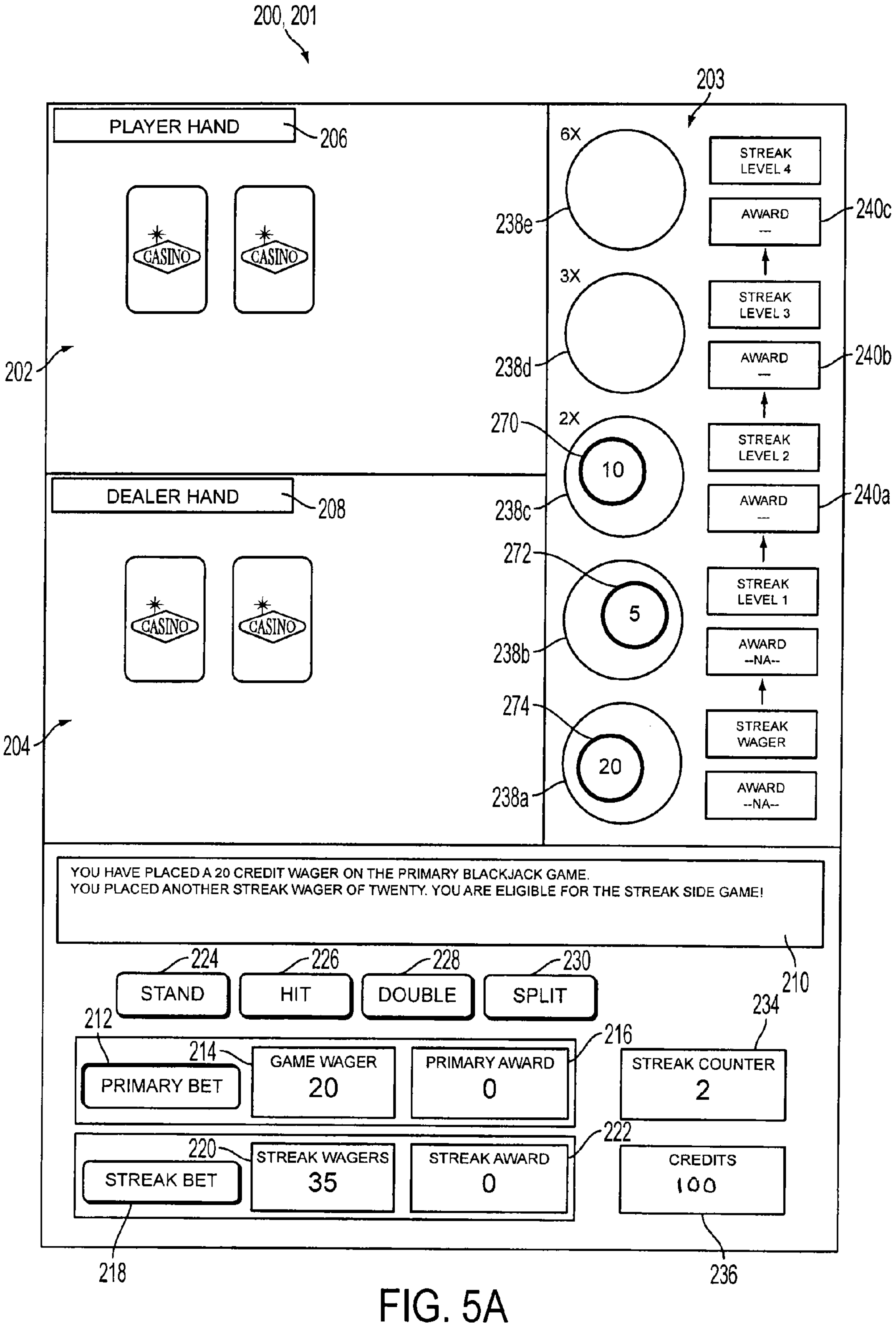
FIGS. 5A, 5B and 5C are top views of an example third round of one embodiment of the primary Blackjack game, where the pattern or streak condition is suspended due to a tie or push.

As illustrated in FIG. 5A, a third round of a play 201 of the game 200 is started. This example round illustrates a suspension of the streak condition in response to the player hand 206 pushing or tying with the dealer hand 208. In the example play 201 of the game 200 illustrated in FIG. 5A, the player makes a primary wager by inputting the wager amount with the primary wager input 212. In this example, the player places a primary wager of twenty credits as indicated in the primary wager area 214, and as indicated in the general message area 210. Also in this play 201 of the game 200, the player places a third streak wager 274 of twenty credits by activating the streak input 218. This third streak wager 274 is indicated in the general message area 210. Also, the cumulative value of the first streak wager 270, the second streak wager 272, and the third streak wager 274 is indicated in the streak wager area 220 to be thirty-five. Also, the second streak wager 274 of twenty credits appears in the streak wager area 238*a* of the streak area 203. The second streak wager 272 of five credits remains in streak wager area 238*b* (i.e., streak level one) of the streak area 203, and the streak wager 270 of ten credits remains in streak wager area 238*c* (i.e., streak level two).

Figure 5B:
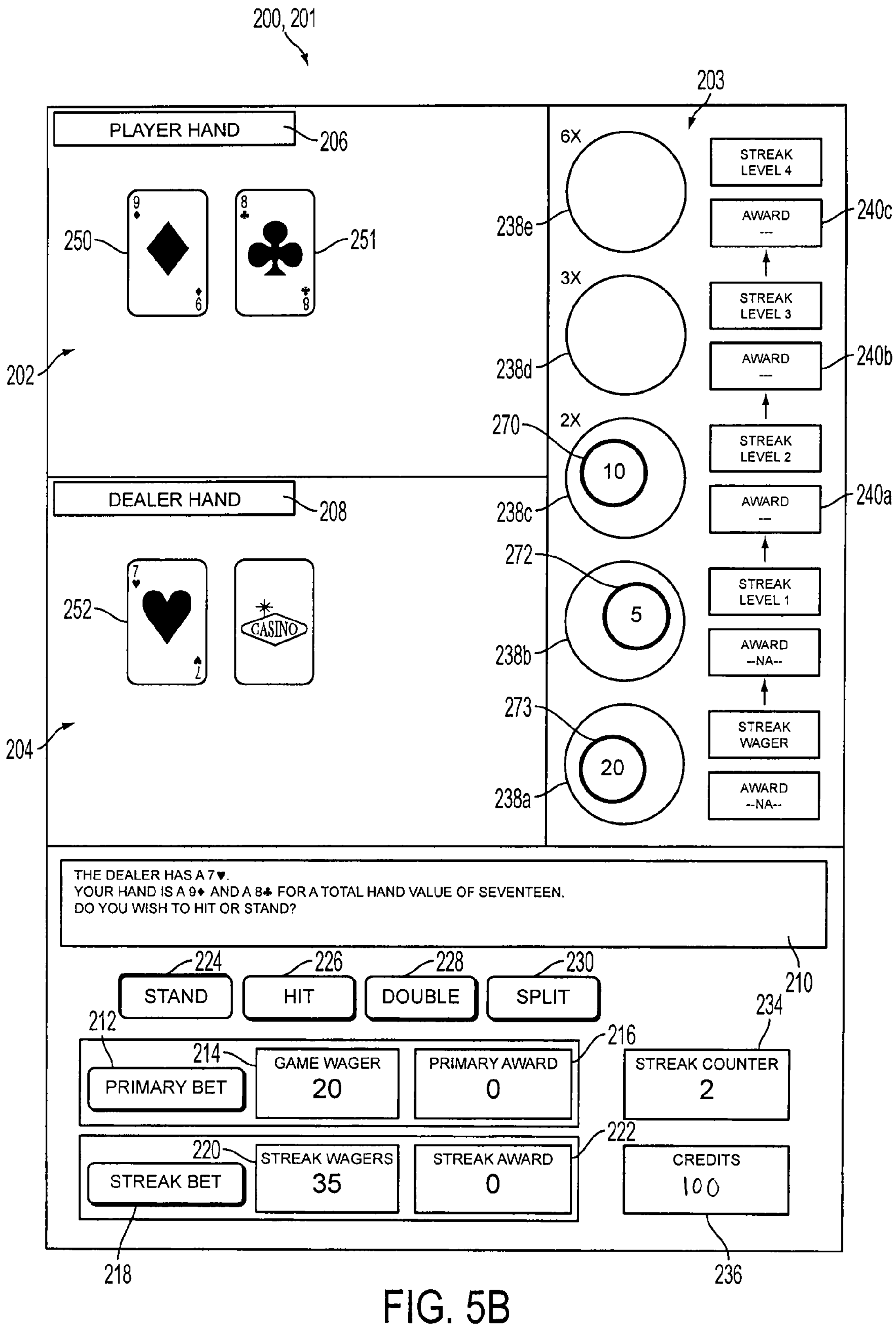

The dealer deals two cards face-down to the player to form an initial player hand 206 and deals two cards in the dealer area 204 to form an initial dealer hand 208. As illustrated in FIG. 5B, a first card 250 and a second card 251 are revealed in the player hand 206. The first card 250 is a nine of diamonds (9♦) and the second card 251 is the eight of clubs (8♣). In the dealer hand 208, one card 252 is revealed as the dealer face-up card, and is a seven of hearts (7♦). As mentioned above, in an embodiment, there are certain circumstances or situations that will suspend the secondary or streak condition for one or more rounds of play 201 of the primary Blackjack game 200.

Figure 5C:
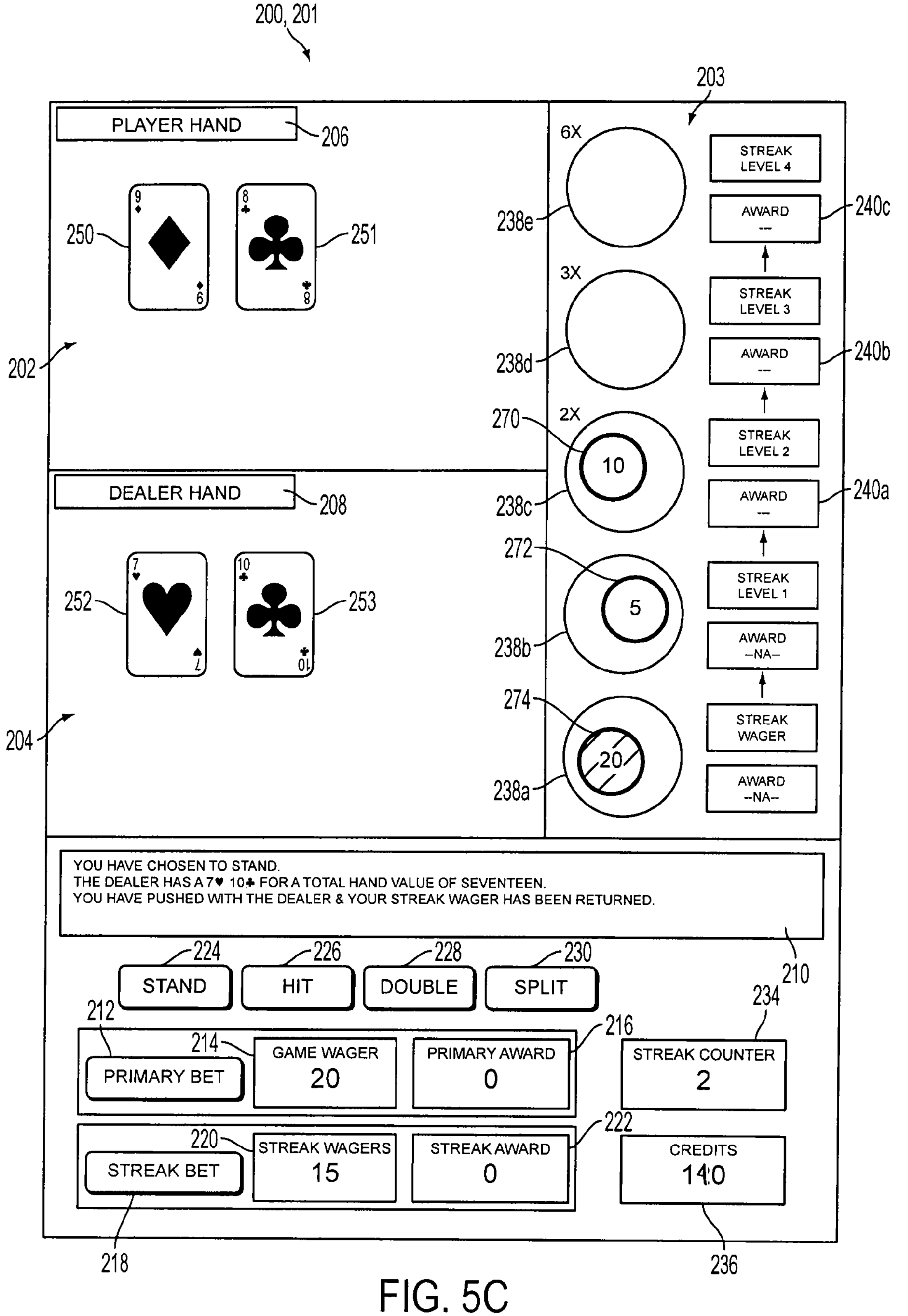

As illustrated in FIG. 5C, the player has chosen to stand, resulting in a final player hand 206 having a value of seventeen. The second card 253 or face-down card of the dealer hand 208 is revealed to be a ten of clubs (J♣), resulting in a final dealer hand 208 having a value of seventeen. Thus, the player pushes or ties with the dealer. In this embodiment, because the player neither won or lost, the streak condition is suspended for the current round. The card game system 100 returns both the player's base wager of twenty credits and makes the supplemental wager of twenty credits available to the player to remove, maintain or modify, as indicated by the total value of streak wagers in the streak wager area 216, the total credits display 236, the general message area 210, and streak wager 274. In one embodiment, the initial streak wager that the player is permitted to modify is left in the initial streak wager area, but a total paid meter (not shown) includes the value of such initial streak wager. In another embodiment, once an initial streak wager is place and a game started, such initial streak wager cannot be removed or modified by the player, even in the case of a suspension of the streak.

Although the player had a push or tie outcome in this round of play 201, because the secondary or streak condition was suspended by the push, the streak is not ended. Because the streak condition was suspended, there are no streak awards provided to the player and streak counter display 234 remains at a total value of two, as indicated in message area 210. This completes the third example play 201 of the Blackjack game 200 and the streak is still active.

Figure 6A:
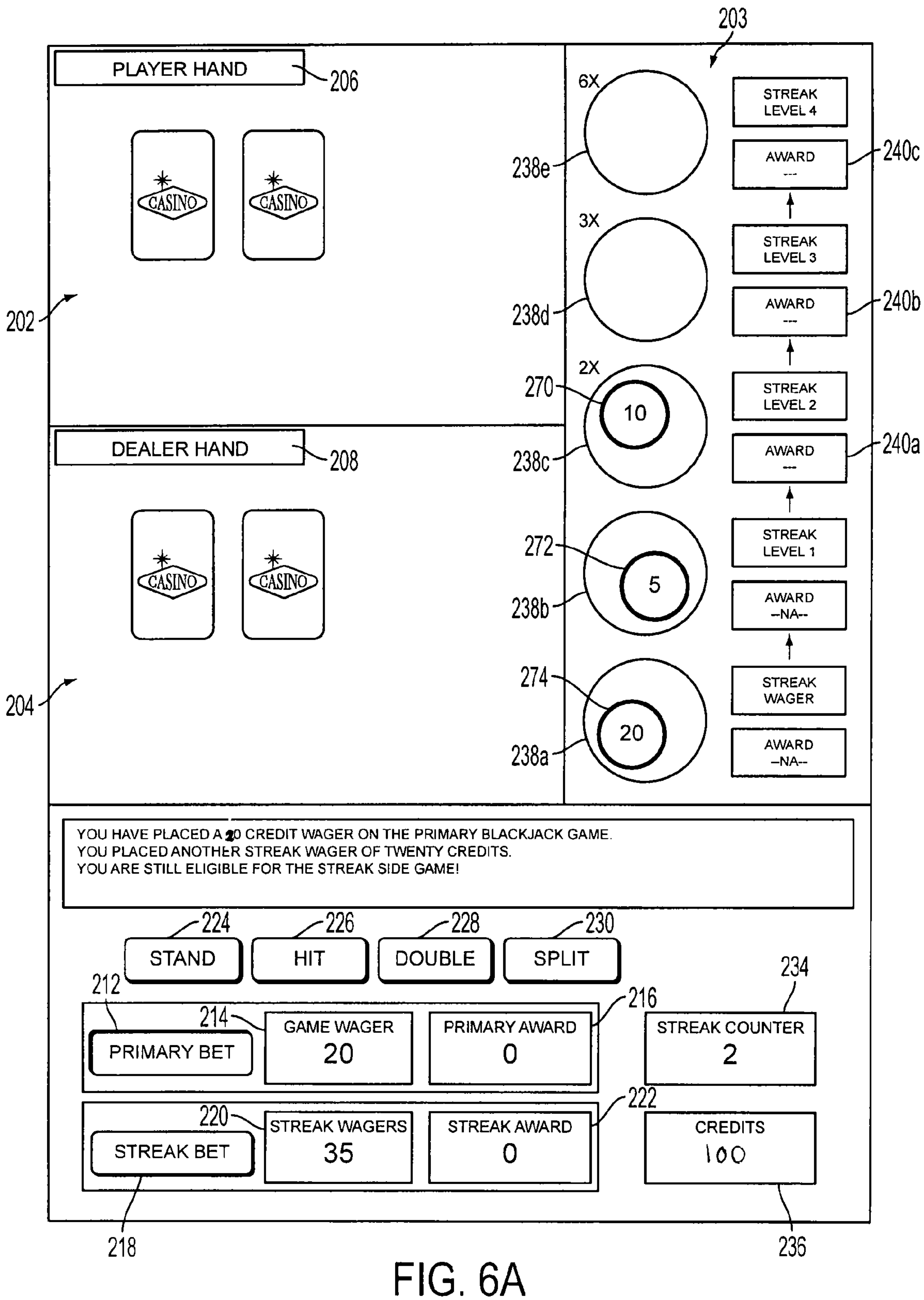
FIGS. 6A, 6B and 6C are top views of an example fourth round of one embodiment of the primary Blackjack game.

As illustrated in FIG. 6A, a new round of a play of the game is started. This round of play illustrates an example of where the player is paid multiple streak awards based on multiple previously placed streak wagers 270 and 272. In the example play of the game 200 illustrated in FIG. 6A, the player makes a primary wager by inputting the wager amount with the primary wager input 212. In this example, the player places a primary wager of twenty credits as indicated in the primary wager area 214, and as indicated in the general message area 210. Also in this play 201 of the game 200, the player chooses to place a streak or supplemental wager 274 of twenty credits and the cumulative value of all supplemental wagers 270, 272 and 274 increases to thirty-five, as indicated in streak wager area 220. Referring to FIG. 6A, the dealer deals two cards face-down to the player to form an initial player hand 206. Similarly, the dealer deals two cards in the dealer area 204 to form an initial dealer hand 208.

Figure 6B:
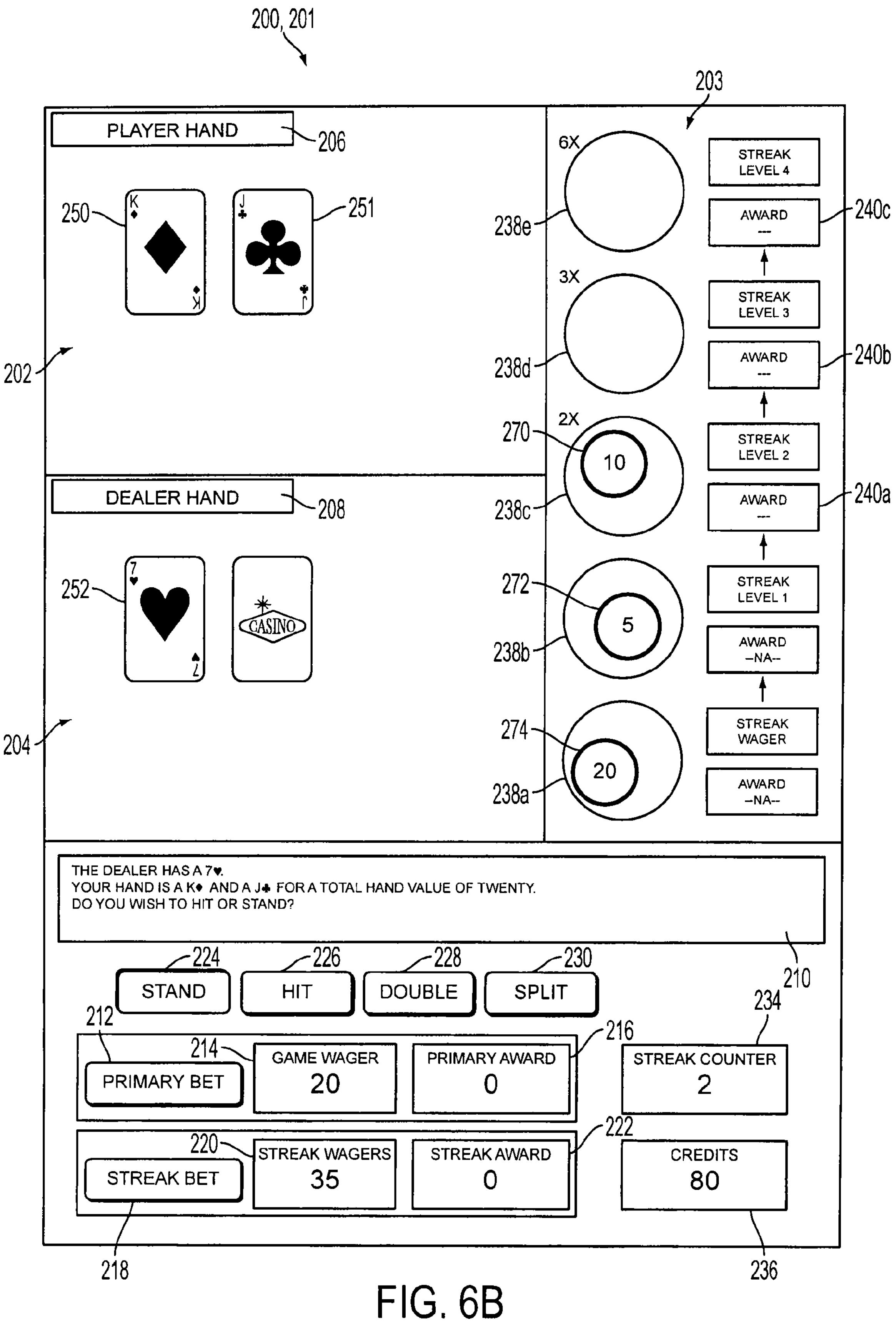

Referring to FIG. 6B, a first card 250 and a second card 251 are revealed in the player hand 206. The first card 250 is a King of diamonds (K♦) and the second card 251 is the Jack of clubs (J♣). In the dealer hand 208, one card 252 is revealed as the dealer face-up card, and is a seven of hearts (7♥). At this point, the player is able to hit, stand, double-down, or otherwise modify the player hand 206 according to conventional Blackjack logic, as described above. The player hand 206, including the King of diamonds and the Jack of clubs (K♦ J ♣), has an initial hand value of twenty, as indicated in the message area 210. In this example, the player chooses to stand by activating the stand input 224.

Figure 6C:
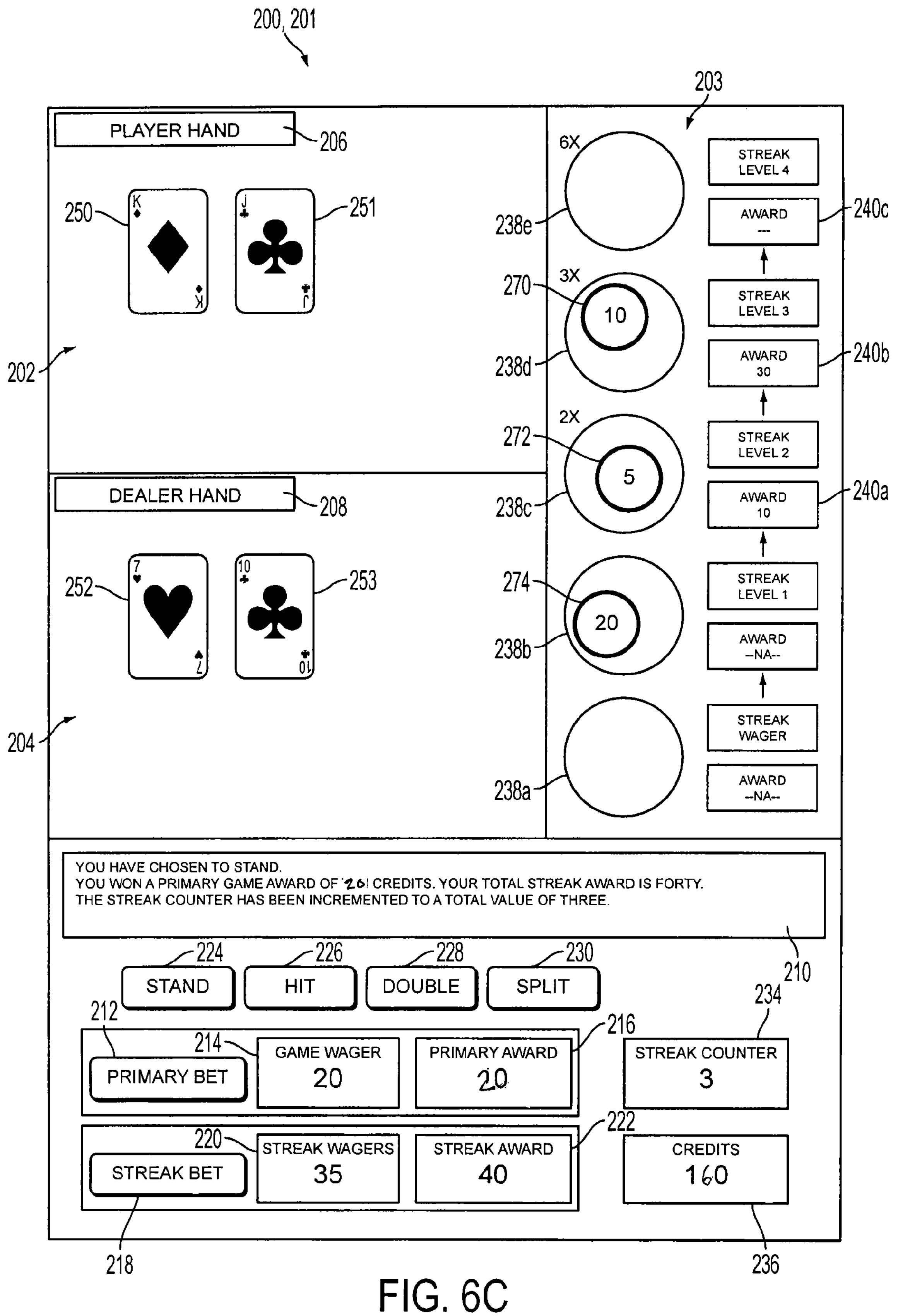

As illustrated in FIG. 6C, the player has chosen to stand and a final value of the player hand 206 is twenty. The second card 253 or face-down card of the dealer hand 208 is revealed to be a ten of clubs (10♣), resulting in the dealer hand 208 having a total value of seventeen. As mentioned above, the dealer is required to hit until the value of the dealer hand 208 is at least seventeen. However, when the dealer hand 208 exceeds or meets a value of seventeen, the dealer is required to stand. In this example, because the dealer hand has a total value of seventeen, the dealer must stand. The final value of the player hand 206 exceeds the final value of the dealer hand 208. Therefore, the player wins this round of play 201.

Because the player has won the round of play 201, the supplemental wagers or streak wagers 270, 272 and 274 are advanced in the streak area 203 to the next streak levels. Referring to FIG. 6C, the first streak wager 270 is advanced from the streak wager area 238*c* to the streak wager area 238*d*, where streak wager area 238*d* corresponds to a streak level of three. The second streak wager 272 is advanced from the streak wager area 238*b* to streak wager area 238*c*, which corresponds to a streak level of two. Also, the third streak wager 274 is advanced from the streak wager area 238*a* to streak area 238*b*. As mentioned above, in this embodiment, there is no streak award associated with a streak level of one. Thus, there is no streak award associated with the third streak wager 274. However, for streak level two, a secondary or streak award is provided that is equal to 2× the amount of the streak wager 272. Also, for a streak level of three, a secondary or streak award is provided that is equal to 3× the amount of the corresponding streak wager 270. Therefore, in this round of play 201 of the game 200, a secondary or streak award of ten credits is provided to the player, as indicated in streak award area 240*a*, and a streak award of thirty credits is provided to the player, as indicated in the streak award area 240*b*. The total streak award, which is forty credits in this example, is indicated in the total streak award area 222. Also, because the player won the play 201 of the game 200, the player wins a primary award of twenty credits as indicated in the primary award area 216 and as indicated in the general message area 210. The dealer provides the player with the primary award of twenty credits and also returns the player's primary wager of twenty credits. The total credits display 236 is updated to a total of on one-hundred sixty credits (i.e., return of the primary wager, the primary award, and the two different secondary or streak awards). Also, the streak counter display 234 is incremented to a total value of three, as also indicated in message area 210. This completes this play 201 of the Blackjack game 200 and the streak is still active.

Figure 7A:
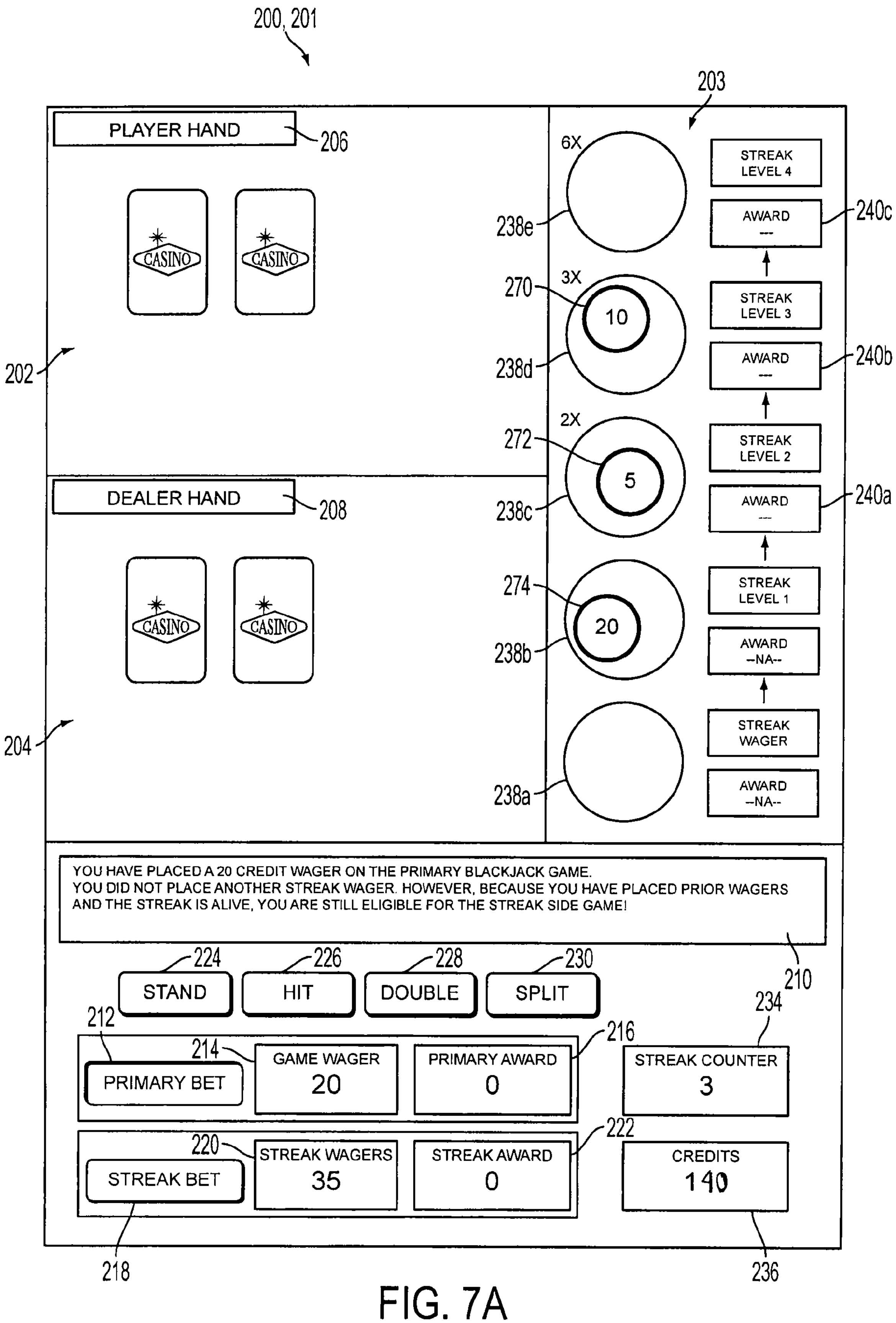
FIGS. 7A, 7B, 7C, 7D and 7E are top views of an example fifth round of one embodiment of the primary Blackjack game, where the player splits cards in the player hand.

As illustrated in FIG. 7A, another round of a play of the game is started. This example round of play, as illustrated in FIGS. 7A to 7E, includes a play 201 of the game 200, where the player chooses to split the cards in the initial player hand 206 into a plurality of player hands 280*a* and 280*b*. In this embodiment, the resolution of the pattern or streak condition is based on whether the player wins all split hands, loses all split hands, or achieves a different outcome than winning all split hands or losing all split hands. If the player wins all split hands, the streak is advanced and the player is paid any streak awards. If the player loses all split hands, the streak is ended and the player must forfeit all streak wagers. For any other combination of split card outcomes, the streak remains alive but does not advance. For example, if the player wins one hand and pushes or ties all of the other split hands, the streak remains alive but does not advance. In another example, if the player hand 206 is split into three hands, and the first hand is a win, the second hand is a push, and the third hand is a loss, the streak continues but any supplemental or streak wagers do not advance to the next higher streak level.

In the scenario where all the split hands do not beat the dealer's hand while all of such split hands do not lose to the dealer's hand, no streak awards are paid to the player. It should be appreciated that in another embodiment, alternate evaluation rules may be defined for resolving streak bet status relative to split hands. In another embodiment, if a player splits the cards in the player hand, the streak condition is suspended for the round of play, as described above.

Referring to FIG. 7A, the player makes a primary wager by inputting the wager amount with the primary wager input 212. In this example, the player places a primary wager of twenty credits as indicated in the primary wager area 214, and as indicated in the general message area 210. Also in this play 201 of the game 200, the player chooses to forego the optional supplemental wager. Thus, the cumulative value of the streak wagers 270, 272 and 274 remains at thirty-five credits. Referring to FIG. 7A, the dealer deals two cards face-down to the player to form an initial player hand 206. Similarly, the dealer deals two cards in the dealer area 204 to form an initial dealer hand 208. The cards may be dealt face-down or may be dealt with the player cards face-up as in a conventional Blackjack fashion, as described above.

Figure 7B:
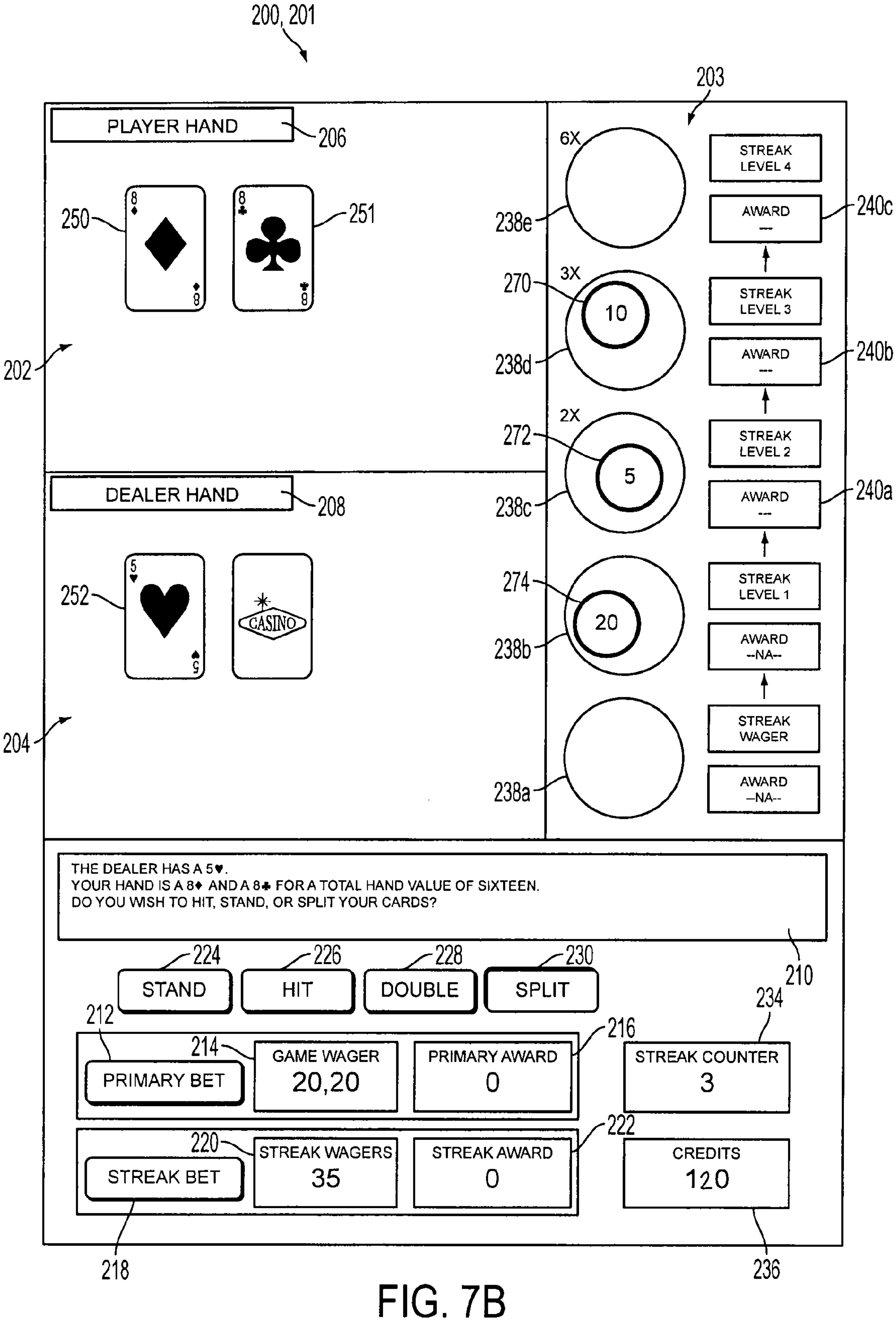

Referring to FIG. 7B, a first card 250 and a second card 251 are revealed in the player hand 206. The first card 250 is an eight of diamonds (8♦) and the second card 251 is the eight of clubs (8♣), for a total initial player hand 206 value of sixteen. In the dealer hand 208, one card 252 is revealed as the dealer face-up card, and is a five of hearts (5♥). At this point, the player is able to hit, stand, double-down, or otherwise modify the player hand 206. In this example, it is statistically advantageous for the player to split the two eights and the player chooses to do split by activating the split input 230.

Figure 7C:
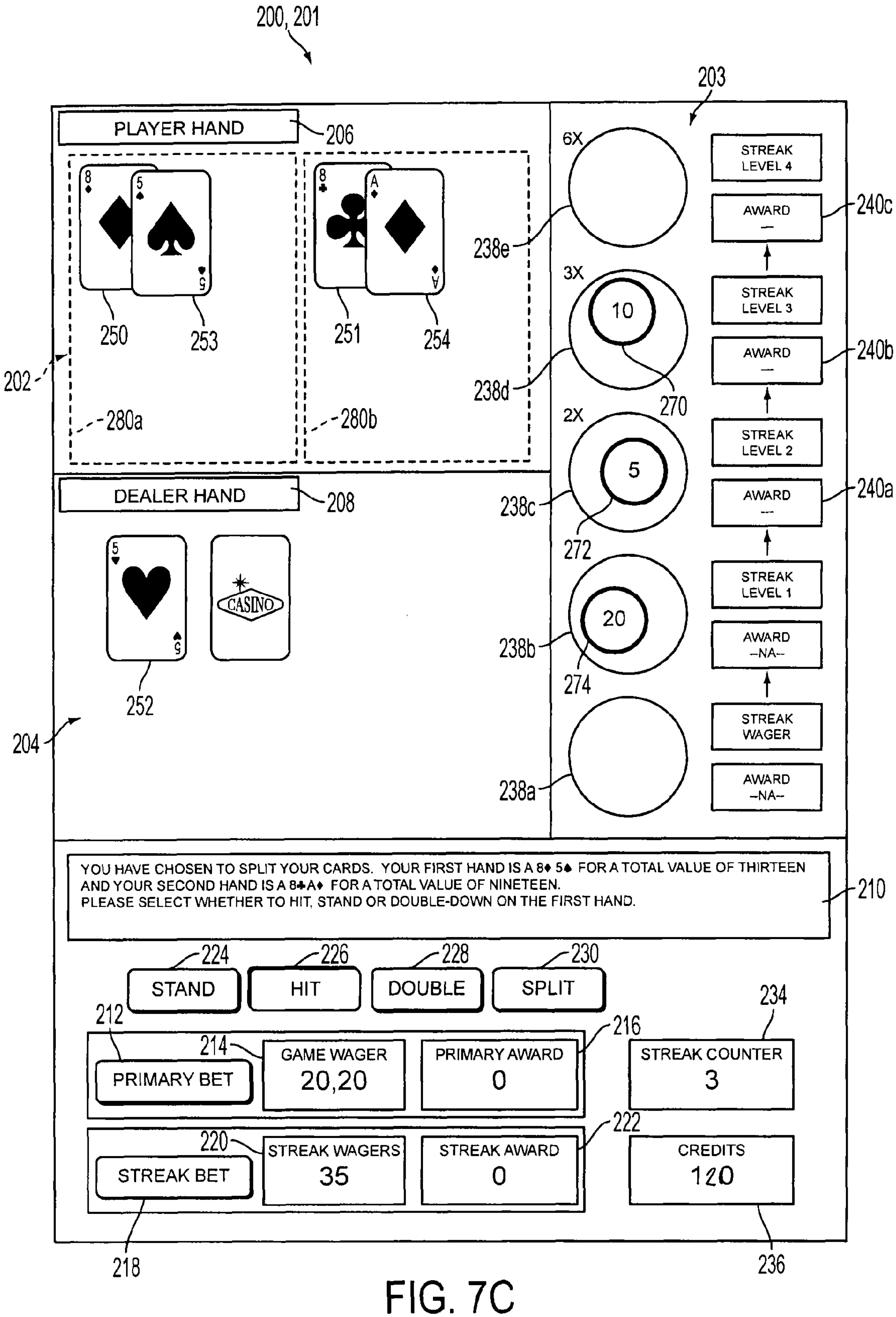

As illustrated in FIG. 7C, the player has chosen to split the initial player hand 206 into a plurality of player hands 280*a* and 280*b*. As indicated in the primary wager area 214, twenty additional credits are wagered on the additional hand. The dealer deals one additional card 253 to the first player hand 280*a*. The additional card 253 is a five of hearts (5♥) and results in an initial value of the first player hand 280*a* of thirteen. Similarly, the dealer deals one additional card 254 to the second player hand 280*b*. The additional card 254 is an Ace of diamonds (A♦) and results in an initial value of the second player hand 280*b* of nineteen.

Figure 7D:
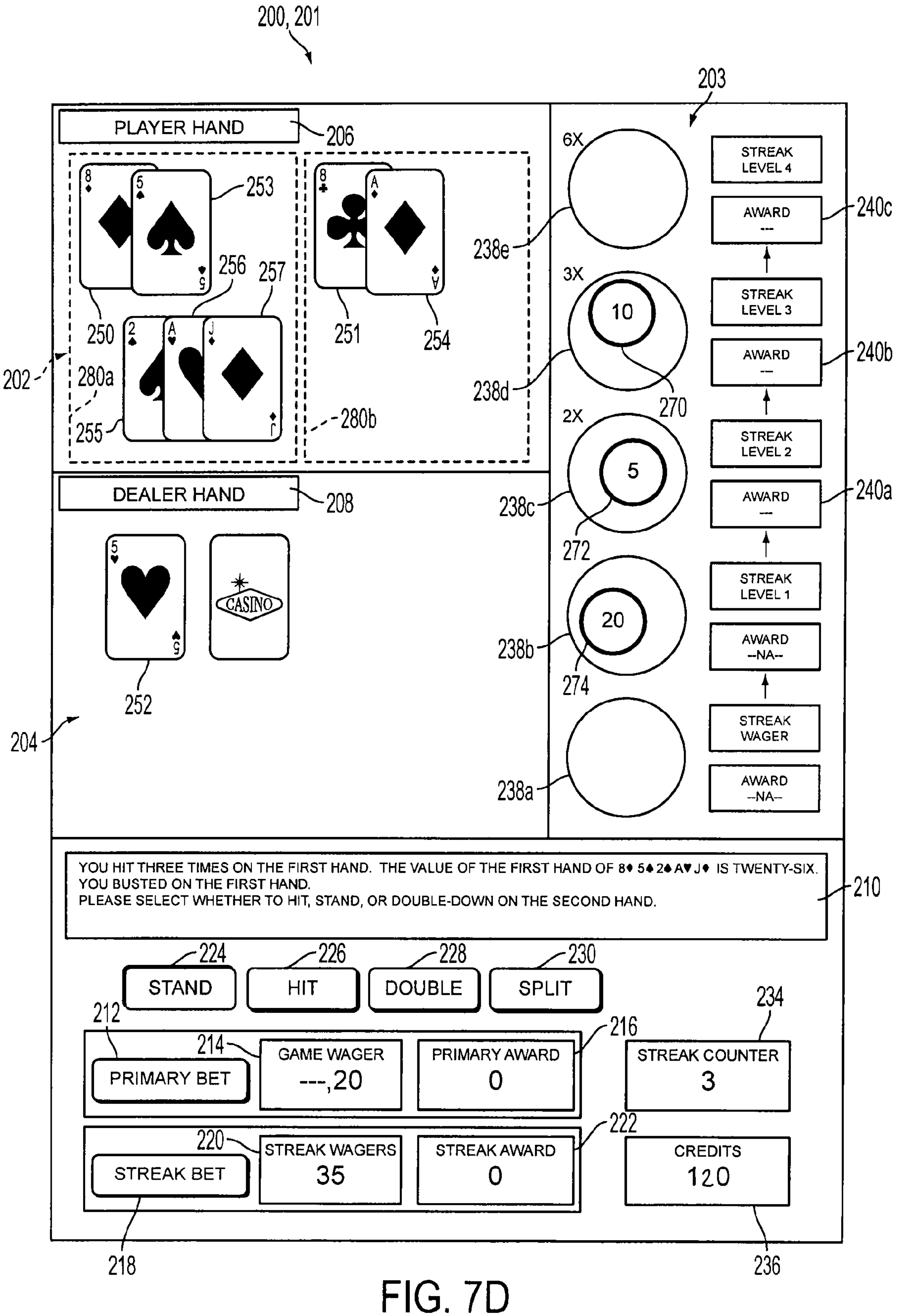

As illustrated in FIG. 7D, the player first resolves the first player hand 280*a*, and then resolves the second player hand 280*b*. In the first player hand 280*a*, the player hits three times by activating the hit input 226. The three hit cards include a two of hearts, an Ace of hearts and a Jack of diamonds (2♠A♥ J♦) for a total of twenty-six. Thus, the player busted on the first player hand 280*a* and loses this hand. The player forfeits twenty credits that were wagered on the second player hand 280*a*, as indicated in the primary wager area 214. In the second player hand 280*b*, the player must choose to hit, stand, or double-down. In this example, the player chooses to stand by activating the stand input 224. The final value of the second player hand 280*b* is nineteen.

Figure 7E:
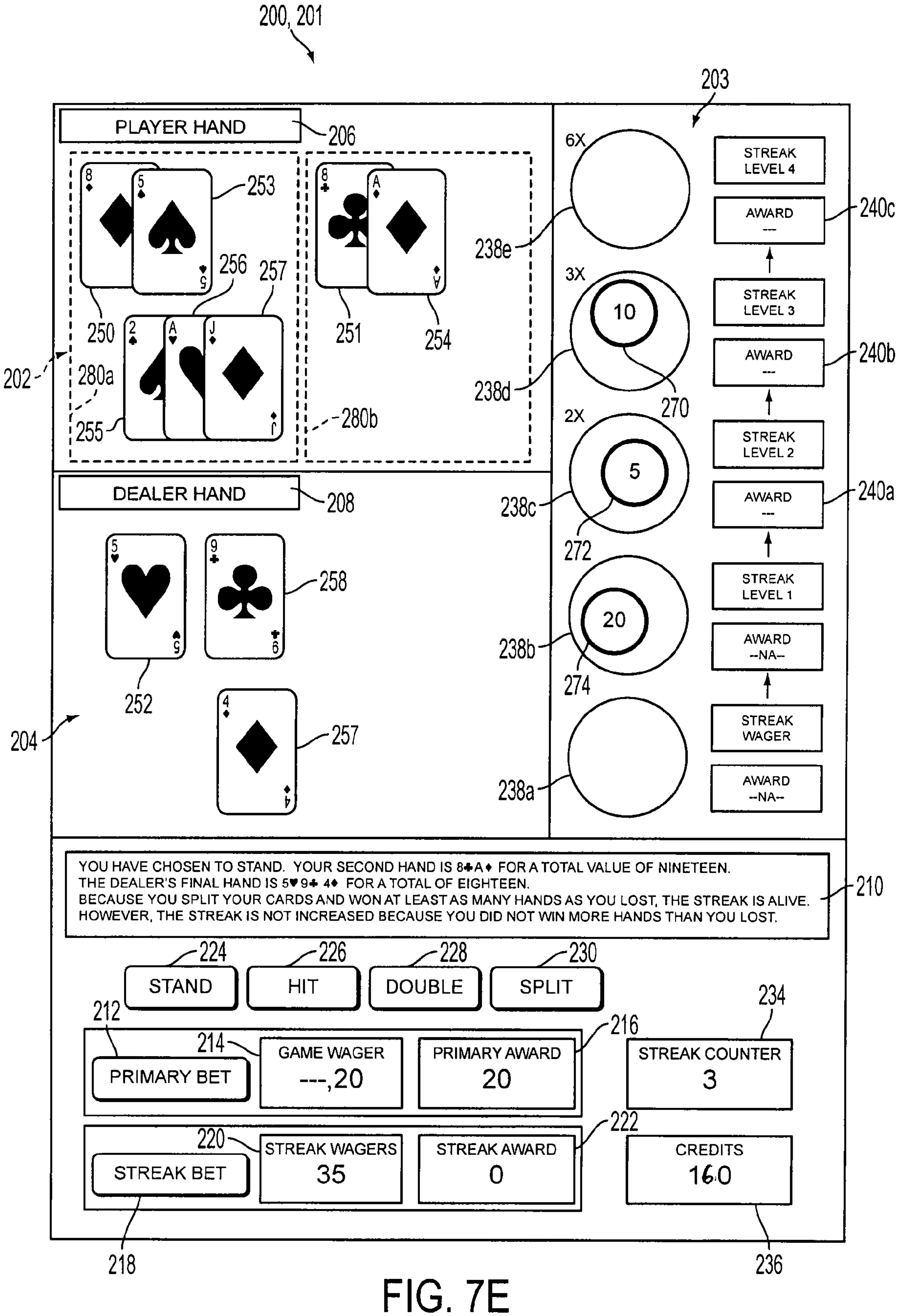

As illustrated in FIG. 7E, the second card 258 or face-down card of the dealer hand 208 is revealed to be a nine of clubs (9♣), giving the dealer hand 208 an initial value of fourteen. As mentioned above, the dealer is required to hit until the value of the dealer hand 208 is at least seventeen. In this example, because the dealer hand 208 has a total value of only fourteen, the dealer must hit. The dealer hits once and receives a four of diamonds (4♦) as a third card 259. The final value of the dealer hand 208 is eighteen. The final value of the second player hand 280*b* exceeds the final value of the dealer hand 208. Therefore, the player wins the second player hand 280*b*. Also, because the player won one hand of the play 201 of the game 200, the player wins a primary award of twenty credits as indicated in the primary award area 216 and as indicated in the general message area 210. The dealer provides the player with the primary award of twenty credits and also returns the player's primary wager of twenty credits. The credits display 236 is updated to a total of one-hundred and sixty credits.

Because the player chose to split cards, and because the player did not win all split hands and did not lose all split hands, the streak is continued the streak wagers 270, 272 and 274 are not advanced to the next streak levels. Moreover, streak awards are not provided to the player for this play 201 of the game 200. This completes this example play 201 of the Blackjack game and the streak is still active.

In an embodiment, if a player splits the player hand 206 into two or more player hands, the plurality of outcomes of the player hands are treated as one outcome for purposes of the secondary or streak condition. For example, if the player splits the cards to form two hands and subsequently wins both hands, any secondary or supplemental wager are only advanced one streak level.

Figure 8A:
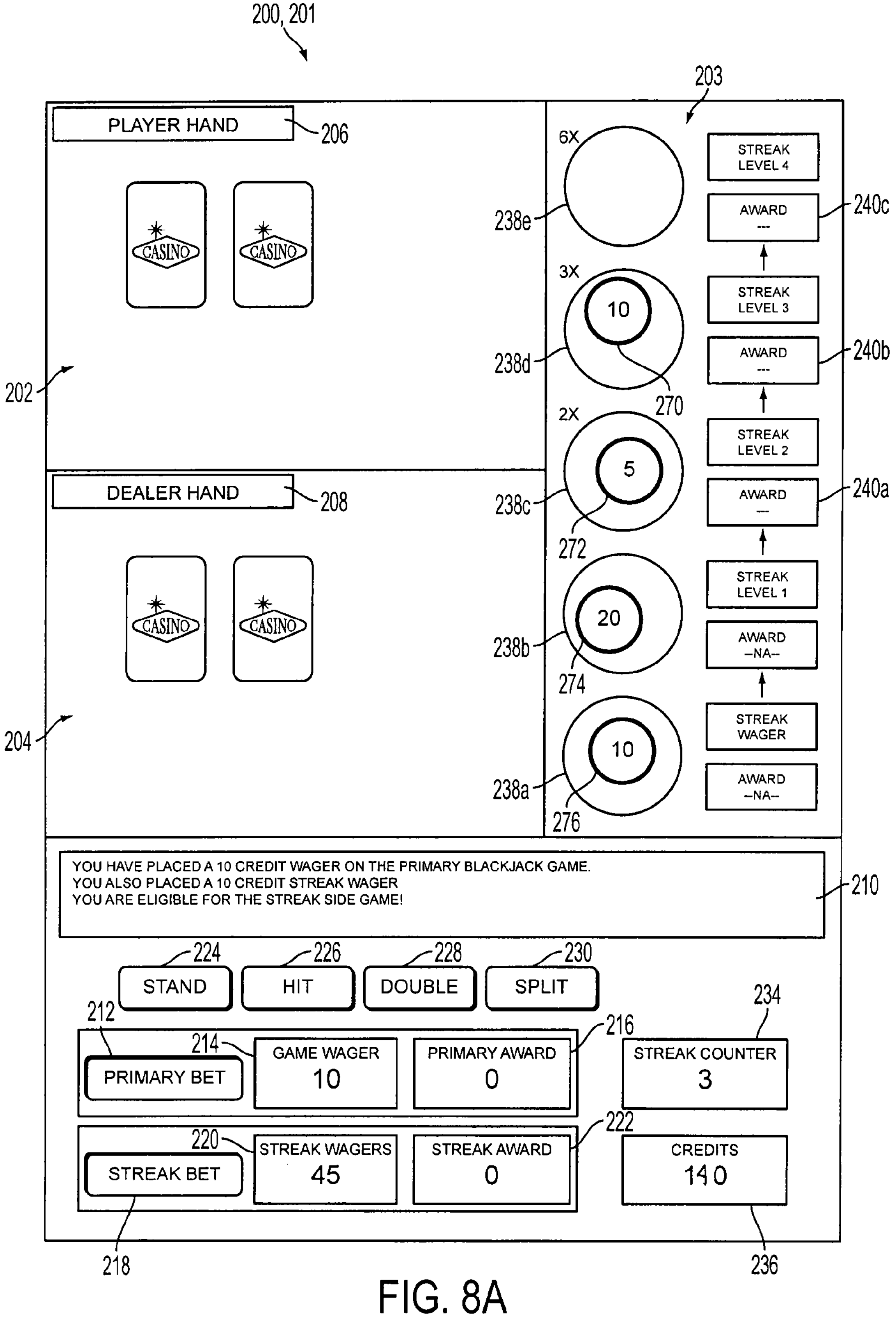
FIGS. 8A and 8B are top views of an example sixth round of one embodiment of the primary Blackjack game, where the player achieves a Blackjack.

As illustrated in FIG. 8A, a new round of a play of the game is started. This round of play illustrates an example where the player achieves a Blackjack and also has four secondary or streak wagers 270, 272, 274 and 276 that are simultaneously active. In the example play 201 of the game 200 illustrated in FIG. 8A, the player makes a primary wager by inputting the wager amount with the primary wager input 212. In this example, the player places a primary wager of ten credits by activating the primary wager input 212, as indicated in the primary wager area 214, and as indicated in the general message area 210. Also in this play 201 of the game 200, the player places an optional supplemental wager of ten credits by activating the supplemental wager input 218, as also indicated in the general message area 210. The cumulative value of the four streak wagers 270, 272, 274 and 276 is forty-five, as indicated by the total streak wager area 220. Referring to FIG. 8A, the dealer deals two cards face-down to the player to form an initial player hand 206. Similarly, the dealer deals two cards in the dealer area 204 to form an initial dealer hand 208.

Figure 8B:
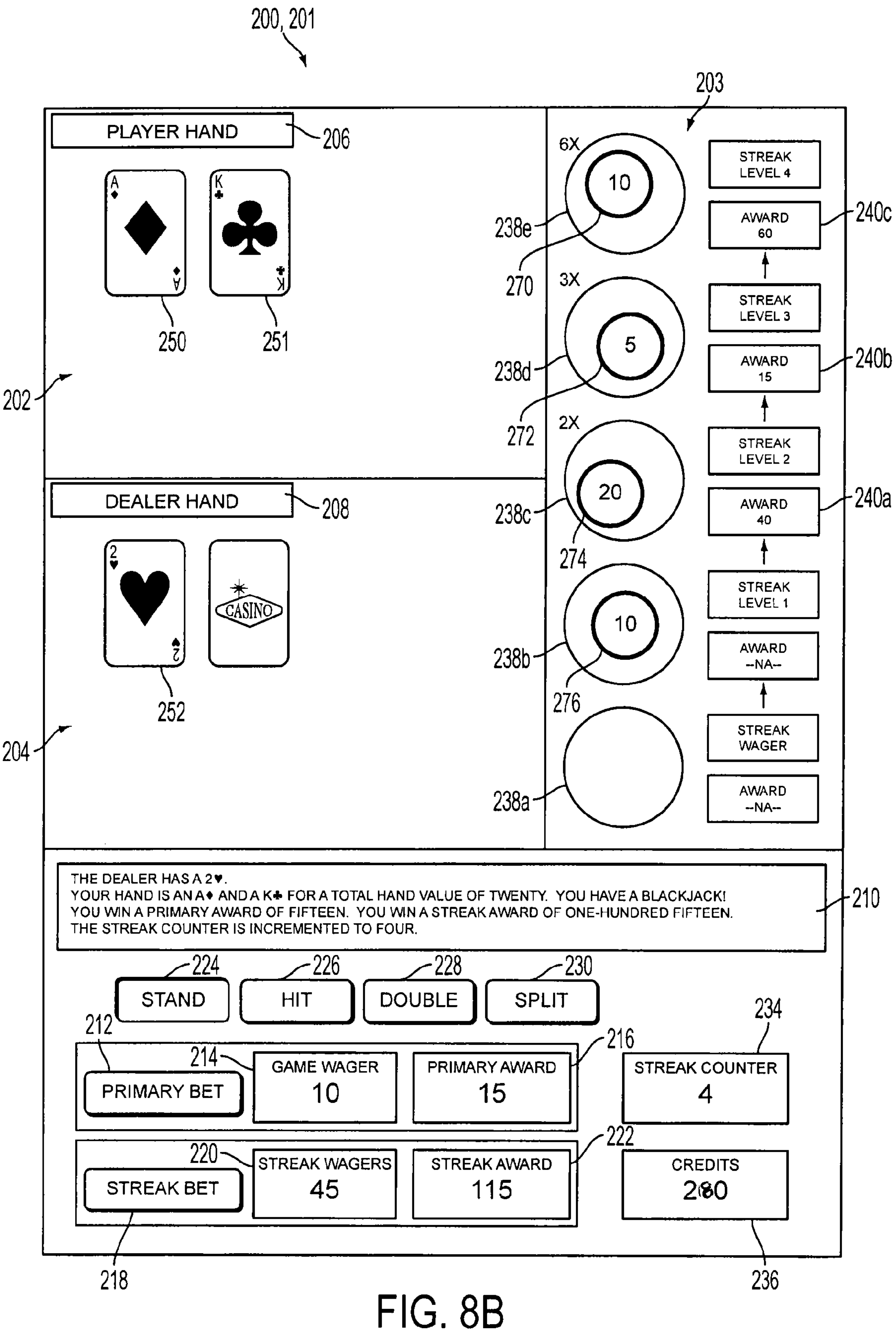

Referring to FIG. 8B, a first card 250 and a second card 251 are revealed in the player hand 206. The first card 250 is an Ace of diamonds (A♦) and the second card 251 is the King of clubs (K♣). In the dealer hand 208, one card 252 is revealed as the dealer face-up card, and is a two of hearts (2♥). Because the player hand 206 is a Blackjack and it has been determined that the dealer hand 208 is not a Blackjack, the player wins this round of play 201. The player wins a primary award of fifteen credits as indicated in the primary award area 216 and as indicated in the general message area 210 (conventional Blackjack logic pay 3:2 when the player achieves a Blackjack and the dealer does not have a Blackjack). The dealer provides the player with the primary award of fifteen credits and also returns the player's primary wager of ten credits. It should be appreciated that in some embodiments, streak wager rules differ for a player winning with a Blackjack relative to streak wager rules for other types of player wins.

Because the player has won this round of play 201, the supplemental wagers or streak wagers 270, 272, 274 and 276 are advanced in the streak area 203 to the next streak levels. Referring to FIG. 8B, the streak wagers are advanced as follows: (a) the first streak wager 270 is advanced from the streak wager area 238*d* to the streak wager area 238*e*, where streak wager area 238*e* corresponds to a streak level of four; (b) the second streak wager 272 is advanced from the streak wager area 238*c* to streak wager area 238*d*, which corresponds to a streak level of three; (c) the third streak wager 274 is advanced from the streak wager area 238*b* to streak wager area 238*c*, which corresponds to a streak level of two; and (d) the fourth streak wager 276 is advanced from the streak wager area 238*a* to streak wager area 238*b*, which corresponds to a streak level of one.

As mentioned above, in this embodiment, there are no streak awards associated with a streak level of one. Thus, there is no streak award associated with the fourth streak wager 276. However, several secondary or streak awards are provided for the streak wagers 270, 272 and 274 at the higher streak levels. In particular the supplemental awards are provided as follows: (a) for streak level two an award is provided that is equal to 2× the amount of the streak wager 274 (i.e., forty credits), as indicated in the streak award area 240*a*; (b) for streak level three an award is provided that is equal to 3× the amount of the streak wager 272 (i.e., fifteen credits), as indicated in the streak award area 240*b*; and (c) for streak level four an award is provided that is equal to 4× the amount of the streak wager 270 (i.e., sixty credits), as indicated in the streak award area 240*c*. Therefore, in this round of play 201 of the game 200, a total streak award, which is one-hundred fifteen credits in this example, is indicated in the total streak award area 222. The total credits display 236 is updated to a total of two-hundred eighty credits (i.e., return of the primary wager, the primary award with 3:2 Blackjack payout, and the three different secondary or streak awards). Also, the streak counter display 234 is incremented to a total value of four, as also indicated in message area 210. This completes this play 201 of the Blackjack game 200 and the streak is still active.

Although the above-examples have applied multipliers or award modifiers of 2×, 3× and 6× to streak levels two, three, and four, respectively, it should be appreciated that any suitable multiplier or award may be used. Although the above-example have no multipliers or award modifiers for streak level one, it should be appreciated that an alternate secondary payout schedule can include a multiplier or award modifier for level one. Although the above example has four streak levels, it should be appreciated that any suitable number of levels can be used. Although the awards in the above-examples consist only of multipliers or award modifiers relative to the amount wagered for each supplemental wager, it should be appreciated that other types of awards can be defined or specified including, but not limited to, one or more progressive awards, anti-terminators, bonus round activations, and one or more randomly selected award multipliers from a selection of possible award multipliers. In one embodiment, one or more supplemental awards include a number of free rounds or plays of the game or a designated amount of game action. Action generally refers to a wager placed by a gaming establishment on and for the benefit of the player, where the wager itself is forfeited regardless of whether the player wins or loses, but the player is allowed to keep any winnings. Thus, in an example where the streak awards or supplemental awards are game action, the player essentially is able to play risk free for a number of plays of the game. In addition to the award example listed above, the streak awards may be any suitable award.

Figure 9A:
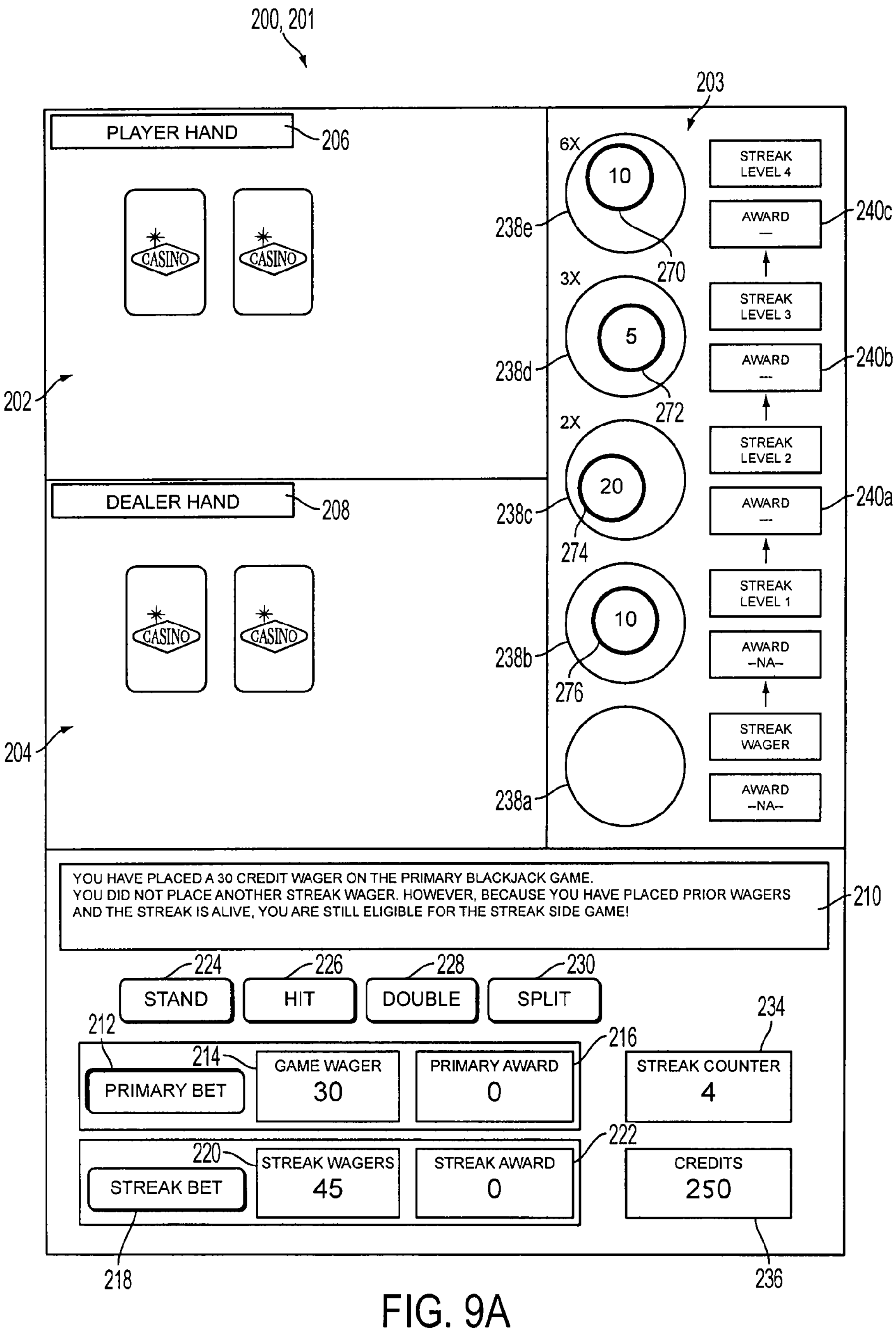
FIGS. 9A and 9B are top views of an example seventh round of one embodiment of the primary Blackjack game, where the secondary streak condition has ended.

As illustrated in FIG. 9A, a new round of a play of the game is started. This round of play illustrates an example where the player's streak has ended and all of the supplemental wagers 270, 272, 274 and 276 are forfeited. In the example play 201 of the game 200 illustrated in FIG. 9A, the player makes a primary wager by inputting the wager amount with the primary wager input 212. In this example, the player places a primary wager of thirty credits by activating the primary wager input 212, as indicated in the primary wager area 214, and as indicated in the general message area 210. Thirty credits are subtracted from the player's credits, as indicated by the adjusted total number of credits in the total credits display 236. Also in this play 201 of the game 200, the player chooses to forego the optional supplemental wager. Referring to FIG. 9A, the dealer deals two cards face-down to the player to form an initial player hand 206. Similarly, the dealer deals two cards in the dealer area 204 to form an initial dealer hand 208.

Figure 9B:
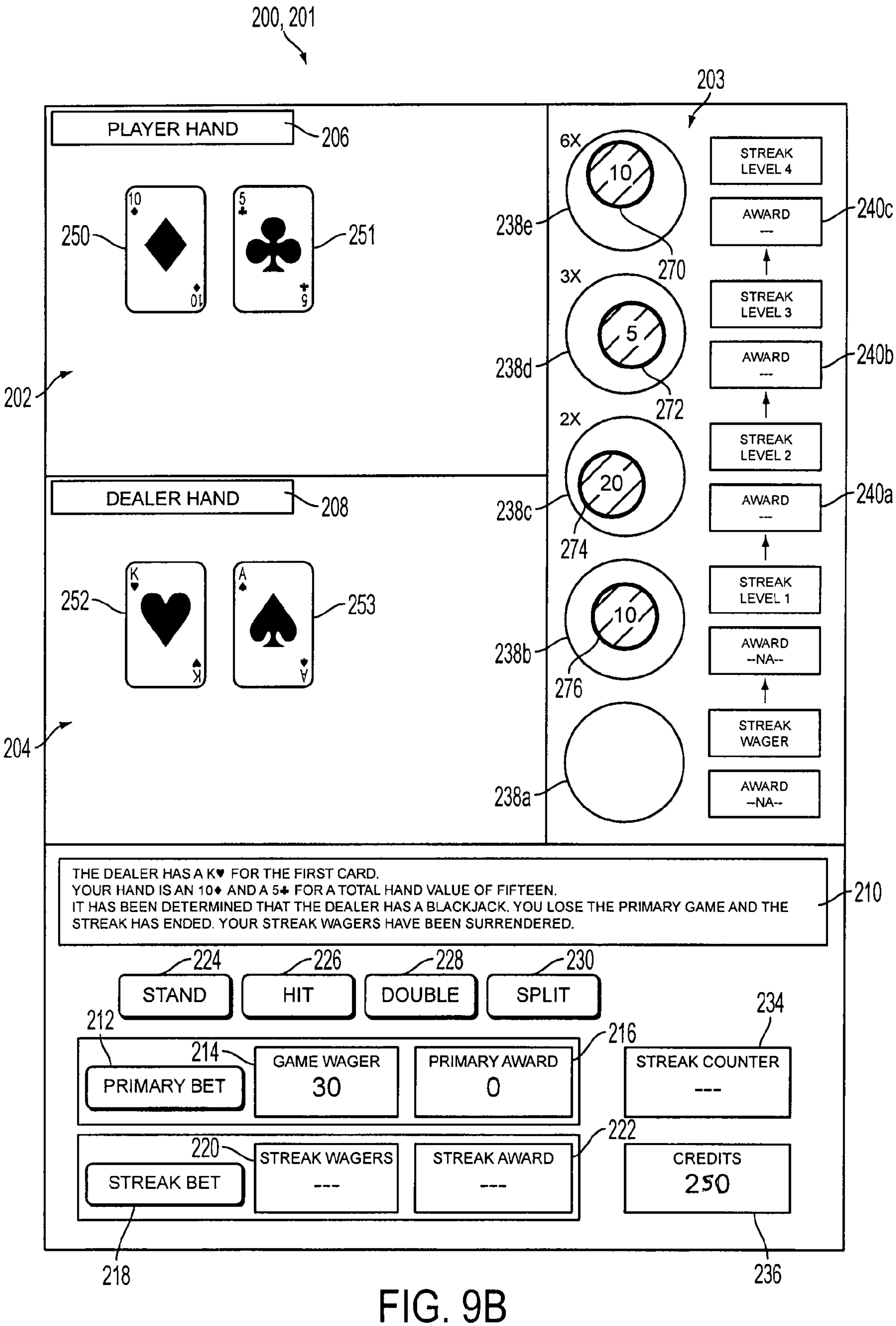

Referring to FIG. 9B, a first card 250 and a second card 251 are revealed in the player hand 206. The first card 250 is a ten of diamonds (10♦) and the second card 251 is the five of clubs (5♣). In the dealer hand 208, one card 252 is revealed as the dealer face-up card, and it is a King of hearts (K♥). Because the face-up card in the dealer hand 206 is a ten value card, it must be first determined whether the dealer hand 208 is a Blackjack. In this example play of the game, the dealer hand 208 in fact is a Blackjack (i.e., K♥A♠) and the player loses this round to the dealer. Because the pattern or streak condition was not suspended by one of the exceptions described above, and because the player lost to the dealer, the streak has ended. The player forfeits all of the supplemental wagers 270, 272, 274 and 276 to the dealer. Moreover, the streak counter is reset to zero, as indicated in the streak counter area 234. Accordingly, the player has forfeited the streak wagers only after having received a plurality of supplemental award based on the streak wagers.

In one embodiment, the maximum streak level is a level of four. In an embodiment, if the player achieves a streak level higher than four, the particular supplemental wager is returned to the player. In one example where the game is played at a gaming table with a human dealer, the wager in the form of a betting chip or token is returned to the player. In another example, the wager is removed from play. In another embodiment, there is no maximum number of streak progressions available to any wager. In one embodiment, each successful advancement of a streak wager along the streak sequence results in an award according to a payout schedule. Such a payout schedule may or may not define an award for the first advancement on the streak sequence. Such a payout schedule may or may not define a different award size for each advancement on the streak sequence which is to result in an award.

Figure 10:
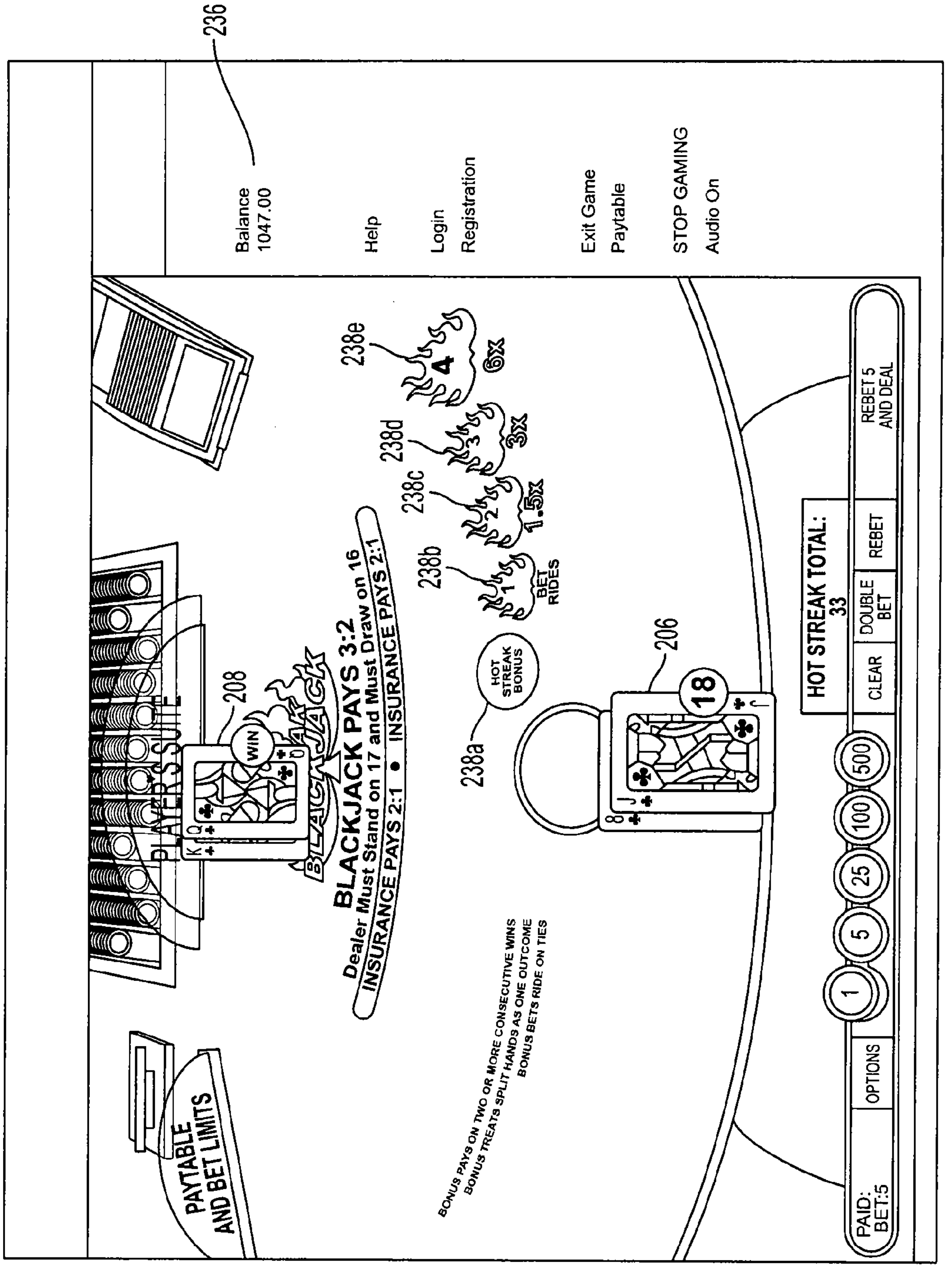
FIG. 10 is a top view of an example of one embodiment of the primary Blackjack game.
Figure 11:
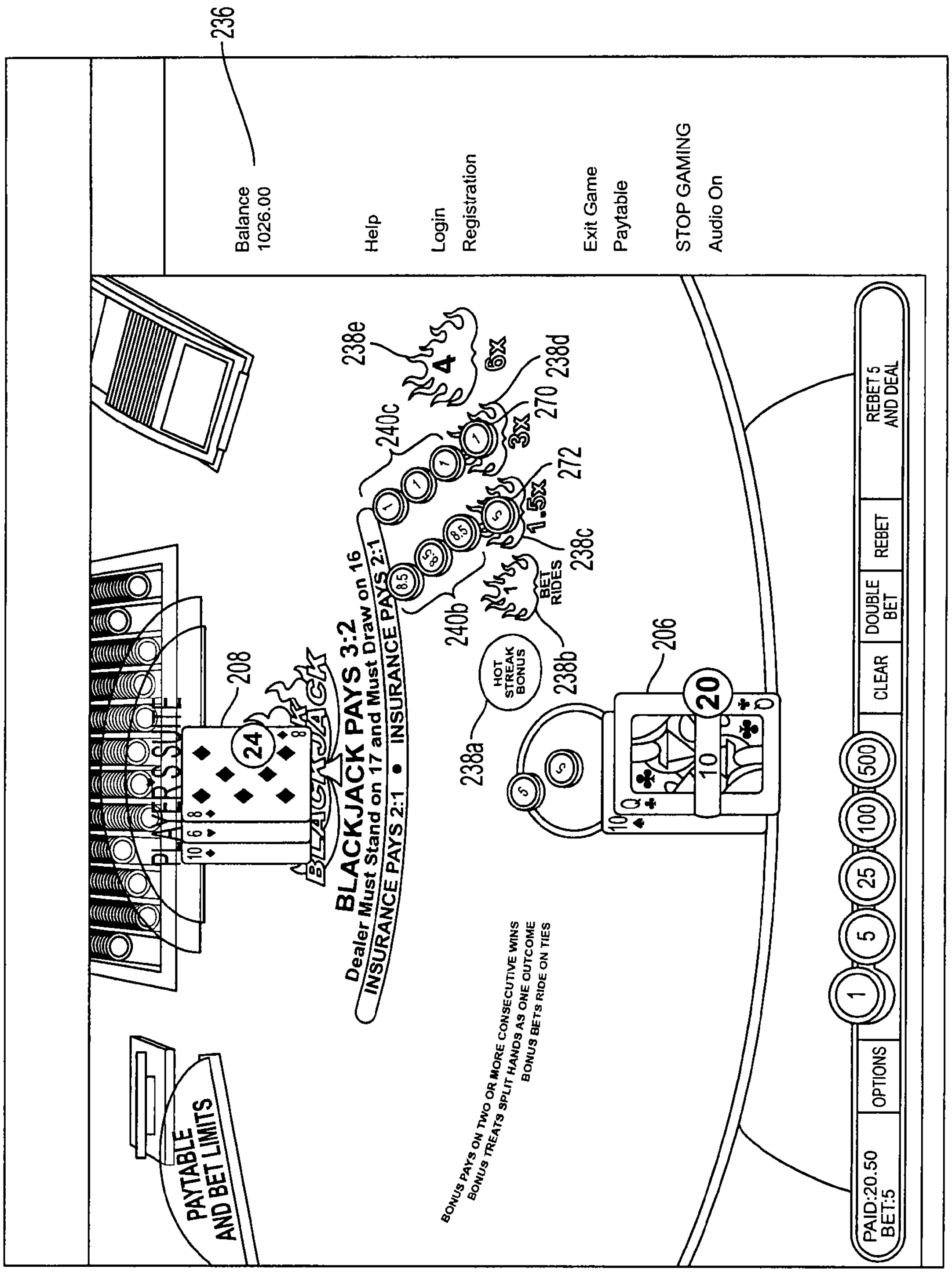
FIG. 11 is a top view of an example of one embodiment of the primary Blackjack game.

FIG. 10 illustrates an example play of the game where only the base game is played. FIG. 11 illustrates another example play of the game where multiple supplemental wagers 272 and 274 have been previously placed and where the player is in the middle of streak. In this illustrated example, the player hand 206 has beaten the dealer hand 208 and two supplemental awards 240*b* and 240*c* are provided to the player. In particular, a supplemental award 240*b* of seven and a half credits is provided on streak wager 272 of five credits (i.e., the award modifier is 1.5×) and another different supplemental award 240*c* of three credits is provided on a streak wager 270 of one credit (i.e., the award modifier or multiplier is 3×). Therefore, in this example, the player's total award is fifteen and a half credits resulting from the primary award of five credits and the two supplemental awards 240*b* and 240*c*.

Figure 12:
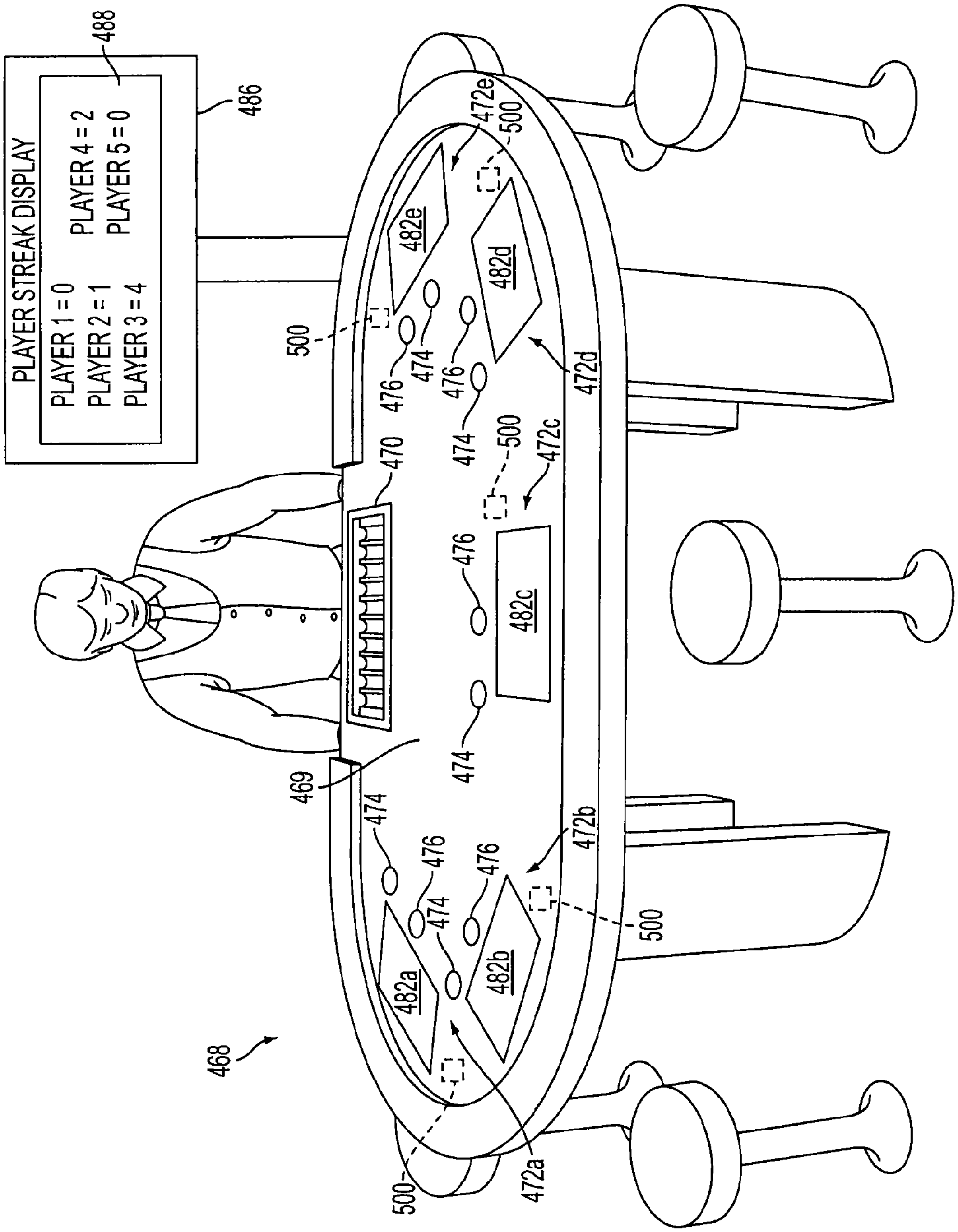
FIG. 12 is a perspective view of one embodiment of the game system, where the primary and secondary rounds are played at a gaming table.
Figure 13:
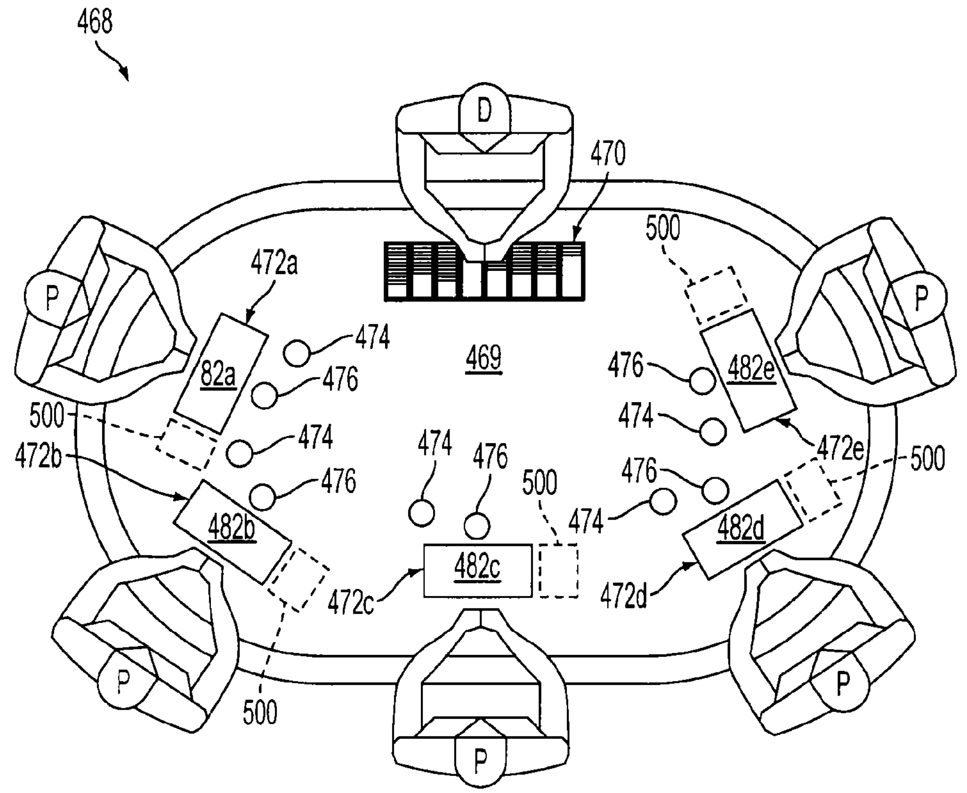
FIG. 13 is a top view of the embodiment of the gaming device illustrated in FIG. 12, where the primary and secondary rounds are played at a gaming table.
Figure 14:
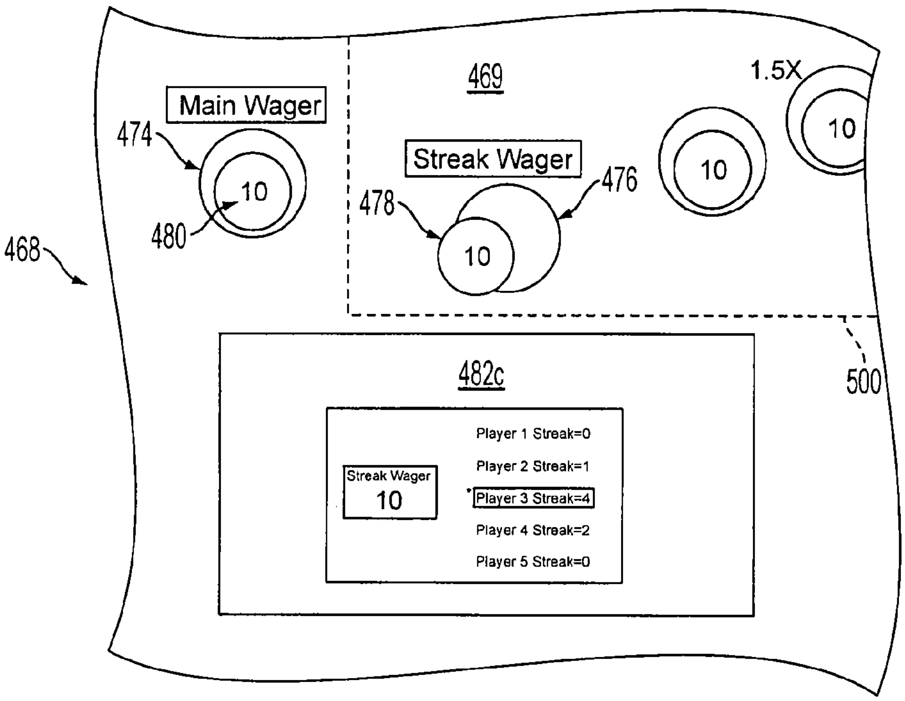
FIG. 14 is a partial enlarged top view of the embodiment of the gaming device illustrated in FIG. 13, where the primary and secondary rounds are played at a gaming table.

In another embodiment, as seen in FIGS. 12, 13 and 14, the game 201 may be a conventional game of Blackjack or Twenty-One played at a gaming device or live gaming table 468, on a playing surface 469, with a human dealer. The gaming table generally includes a chip tray 470 for holding several stacks of the dealer's chips. The dealer uses chips from the chip tray 470 to pay out winning hands or collect chips from players when they have lost. For each of a plurality of playing areas 472*a* to 472*e*, there is a game wagering area 474 and a secondary or streak wagering area 476 (best seen in FIG. 14). In one embodiment, prior to the initiation of a round of Blackjack, each player places his or her wager substantially within the game and optional secondary wagering areas 474, 476. In another embodiment, the players may place the secondary wagers at a later time. In the example illustrated in FIG. 14, the secondary wager 478 is smaller than the game wager 480. However, in other embodiments, the secondary wager 478 is equal to or larger than the game wager 480. As seen in FIG. 12, in an embodiment, the gaming device or gaming table 468 includes a plurality of display devices 482*a* to 482*e*, one for each of the players. In one embodiment, the display devices are used for displaying the current values of any streaks that have been achieved by each player over the course of several rounds of the primary Blackjack game. In a further embodiment, the gaming device or gaming table 468 includes another display device 486 as a community display that displays the streak levels of one or more players at the table 468. In one example, a player that has a streak progression at a certain threshold or higher may have his hand and his streak progression displayed on a community display device. In another embodiment, the streaks of other players playing at different gaming tables 468 throughout the gaming establishment are displayed on either the individual displays 482*a* to 482*e*, or the community display 486, where each gaming table 468 is linked through a network.

In an embodiment, a player may place one or more streak or supplemental wagers on a different player. The player may use the information on the displays 482*a* to 482*e* or 486 to determine which other player may be likely to have a streak. Thus, an inexperienced Blackjack player may attempt to improve that player's overall expected payback by wagering a supplemental wager on a more experienced or skillful player. Alternatively, a superstitious player may choose to place a supplemental wager on another player that appears to be unusually lucky. This provides added excitement and player enjoyment, and contributes to a sense of camaraderie amongst players by allowing a seemingly cooperative gaming environment. In one embodiment, statistics associated with a given player's win, loss and tie record, and/or a player's streak sequence history may be gathered and displayed. In one embodiment, such statistics may be maintained between play sessions for a player possessing a unique player identifier such as a registered online player, a registered server-based gaming player, a player with a player tracking card or other forms of suitable player identification. In one embodiment, a player may be able to control the gathering and/or display of such player's statistics. For example, a player may be able to reset that player's statistics and/or may be able to control if and who may be able to view such player's statistics and/or may be able to control the nature of the statistics data displayed.

In one embodiment, designated rules specify what happens to a first player's streak wager placed upon a second player, if the second player stops playing before the second player's streak sequence is terminated. For example, the first player may have such streak wager returned. In another example, the first player may be given the option of transferring the state of the second player's streak sequence to the first player or to a third player.

In one embodiment, a first player may exclusively make one or more supplemental wagers on one or more second players without the first player also playing Blackjack directly.

Figure 15:
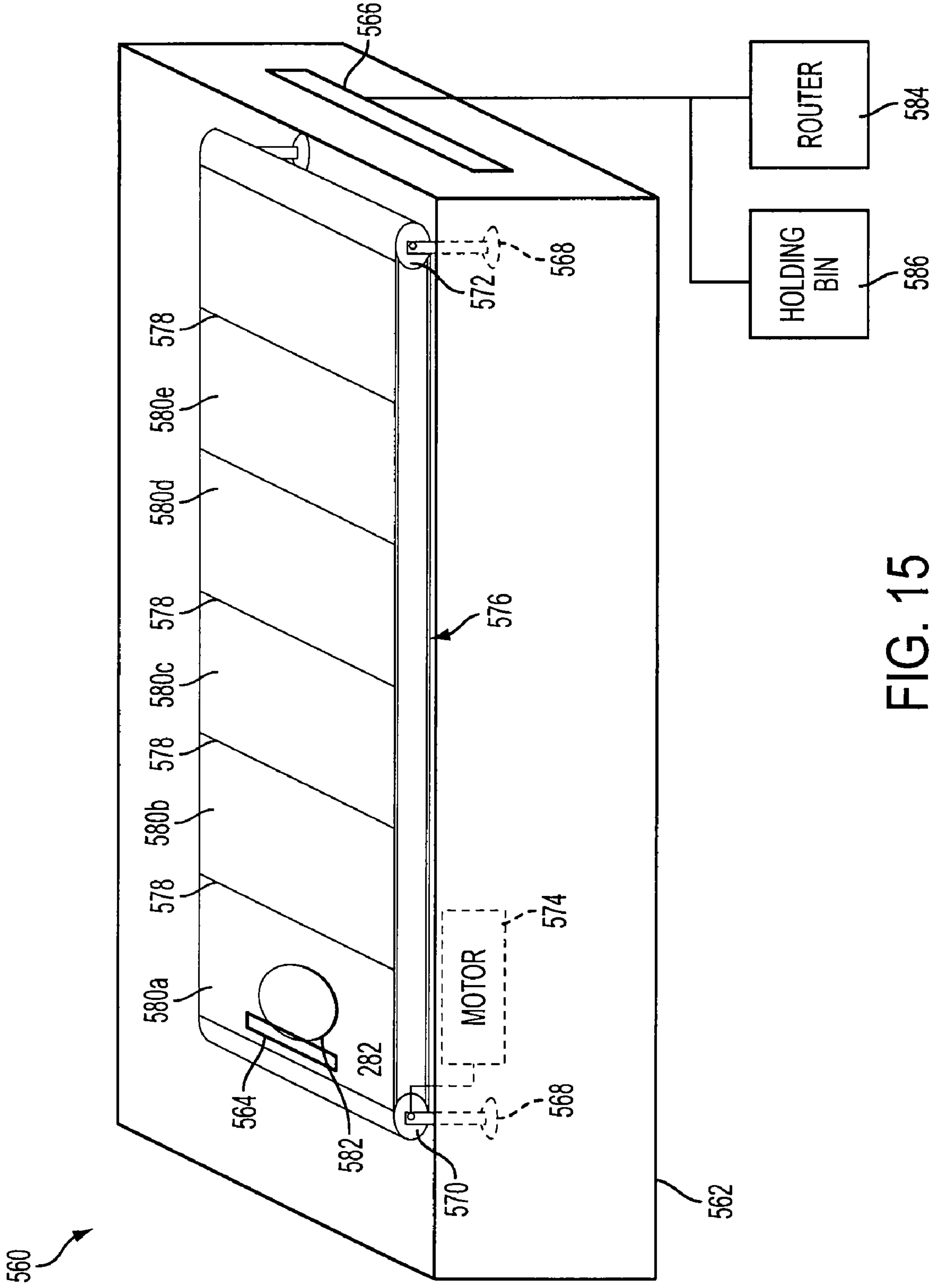
FIG. 15 is a perspective view of an embodiment of a conveyor assembly, for use in play of the supplemental wagering game.

Referring to FIG. 15, in one embodiment, the gaming device or gaming table 468 (see also, FIGS. 12 to 14) includes a chip transporter or conveyor assembly 560 that may be implemented in either mechanical or electromechanical form. The chip transporter 560 operates to produce a demonstration or exhibition of the functions of the outcome tracker 508. In one embodiment, the chip transporter 560 includes a lockable cover or casing 562, which may be a substantially clear plastic material or other substantially see-through material. The casing 562 has a chip receiving slot or input 564 and a chip chute or output 566.

The chip transporter 560 includes a frame 568. The frame 568 is attached to a support structure, such as the surface 469 of the table 468, for operation with the card game system 100. The frame 568 supports at least two rotatably mounted rollers 570 and 572. The rollers 570 and 572 are coupled to a motor 574, which is operable to cause the rollers 570 and 572 to rotate in the same direction. A transporting or conveyor track 576 is endless and movably supported by the rollers 570 and 572 so that as the rollers 570 and 572 rotate, the transporting track 576 moves in the direction of rotation of the rollers 570 and 572. In one embodiment, the motor 574 is configured to cause the rotation of the rollers 570 and 572 after a dealer or player input (e.g., through a suitable input device). In another embodiment, the motor 574 is configured to cause the rotation of the rollers 570 and 572 automatically after a qualifying or designated outcome of a round 201 of the card game 200.

In another embodiment, the gaming device includes an initiation, pusher, or pre-staging device positioned adjacent to a chip transporter 560. In this embodiment, the player places a chip 582 on the pre-staging device. Depending on the embodiment, the dealer or player can operate the pre-staging device to cause the chip to be inserted into the chip receiving slot 564 or the first portion 580*a* of the track 576. In this embodiment, the pre-staging device helps secure the process of inserting chips into the transporter 560. In one embodiment, the pre-staging device reduces the ability of a player from directly placing a chip into or onto the first portion 580*a* of the track. Accordingly, the ability for a player to cheat the gaming establishment by adding or removing secondary wagers after a round of play has commenced is reduced.

The transporting track 576 includes a plurality of dividers or dividing members 578 that separate different portions 580*a*, 580*b*, 580*c*, 580*d* and 580*e* of the transporting track 576. In one embodiment, the dividing members 578 are integral to the track 576. In one embodiment, the dividing members 578 are retaining walls fixedly secured to the track 576 via fasteners, adhesive, bonding or any other suitable securing member. Each separate portion 580*a*, 580*b*, 580*c*, 580*d* and 580*e* of the transporting track 576 corresponds to one of the patterns or streak levels described above. As illustrated, the portion 580*a* of the track 576 corresponds to the supplemental wager placement area, the portion 580*b* corresponds to a first streak level (e.g., the streak level of the lowest amount), and the rightmost portion 580*e* of the track 576 corresponds to the highest or fourth streak level (e.g., the streak level associated with the highest streak award multiplier, such as 6×).

In one embodiment, the award increasers are displayed adjacent to the transporting track 576 so that as the track 576 moves, the separate portions 580*a*, 580*b*, 580*c*, 580*d* and 580*e* thereof correspond to one of the streak levels. For example, if a chip 582 is located at portion 580*c* of the track 576, the chip 582 represents a player qualification for the second streak level, such as an streak level having an associated multiplier of 2×. When the track 576 moves about the rollers 570 and 572, the track moves the chip 582 next to another streak level, such as a streak level having an associated multiplier of 3×. In this manner, the conveyor 560 indicates an award escalator or ladder, wherein a player qualifies for escalating streak levels.

In operation of one example of the card game system 100 described above, after a player has placed a primary wager on the card game 200, the player places a supplemental wager by placing a physical chip 582 into the chip input 564. The chip 582 is received through the chip input 564. The chip input 564 is configured to direct the chip 582 to the leftmost portion 580*e* of the track 576. As described above, the portion 580*c* of the track 576 corresponds to a second streak level. As illustrated, the second streak level has an associated multiplier of 2× and is the lowest streak multiplier available to the player. It should be appreciated that chips associated with different players may be represented with different colors or a designated marker or other indicator.

When the chip 582 advances next to one of the streak levels, the dealer provides the player with an award based on that award multiplier. For example, when the chip 582 advances to the second streak level, the dealer provides the player with an award including any wager on game 201 modified by the multiplier (2×).

After n second wins or other qualifying or designated outcomes of the card game 200 by a player, the motor 574 causes the rollers 570 and 572 to rotate. The rotation of the rollers 570 and 572 causes the track 576 to move. The movement of the track 576 causes the chip 582 to advance next to a another streak level. As illustrated in FIGS. 11 and 12, the second award increaser has a value of 2×. As long as the player avoids a termination condition, the chip 582 continues to advance to different streak levels after successive wins of the card game 200 and the dealer continues to provide awards to a player based on the award multipliers.

As the chip 582 advances to different streak levels 522, the chip 582 moves toward the chip output 566. In one embodiment, when the chip 582 is advanced to the highest streak level, the chip 582 is advanced to the chip output 566 and dumped or otherwise conveyed into a router 584. In another embodiment, when a termination event occurs, such as the indication of loss of the card game by a player, any chips 582 positioned on the track 576 are automatically advanced to the chip output 566 and dumped into the router 584. In this embodiment, when the player has ended the player's streak, the chips 582 are routed to the dealer are forfeited by the player.

With continued reference to FIG. 15, the router 584 is positioned adjacent to the chip output 566 to receive the dumped chips. The router 584 is operable to route chips, tokens or betting markers to individual players at respective wagering stations. In one embodiment, the router 584 includes a delivery tube or chute (not shown) or another suitable delivery mechanism associated with each wagering station to effect the routing.

In one embodiment, chips 582 are dumped from the chip output 566 into a holding bin 586 instead of the router 584. In this embodiment, the chips 582 are not returned to the players. In such an embodiment, in lieu of the player receiving the player's initial wager back upon such wager reaching the highest level of the streak sequence, the value of such wager can be added to the corresponding award paid to the player. In another embodiment, the chips 582 are dumped into the router 582 which directs the chip to the holding bin 586 instead of to one of the wagering stations.

In operation of one embodiment of the system 100, the system 100 involves the steps of: accepting a main game wager; accepting a secondary or streak wager, wherein said streak wager is dependent upon pre-established game outcomes; and resolving said streak wager based on a number of consecutive pre-established game outcomes which occur after placement of the supplemental wager.

In other embodiments, a method and device for offering a Blackjack game with an optional multi-proposition bet is provided. These embodiments extend to a multi-player game whereby one player can place a wager on another player's outcomes, as described above. In these embodiments, a player places a wager which results in an award if k or more successful outcomes of the designated other player occur, up to a maximum of n outcomes.

In an embodiment, a player places a supplemental wager that results in a payout if the player achieves two or more consecutive winning outcomes with no intermediate losing outcomes. One possible pay schedule for such a game is as follows: (a) on the first successful outcome, advance the supplemental wager but do not pay a supplemental award; (b) one the second successful outcome advance the supplemental wager and pay 1.5× the amount of the supplemental wager; (c) on the third successful outcome advance the supplemental wager and pay 3× the amount of the supplemental wager; and (d) on the fourth successful outcome, the streak ends and the dealer returns the supplemental wager to the player and pays the player 7× the amount of the supplemental wager.

In one embodiment as described above, the system 100 enables the player to make a new supplemental wager on the streak condition, while currently within a streak. In one embodiment, the streak ends upon the occurrence of a tie outcome. In another embodiment, the streak advances on the occurrence of a tie outcome. In another embodiment, the streak neither advances nor terminates upon the occurrence of a tie outcome. That is, the pattern or streak condition is suspended until the next play of the game.

In one embodiment, the streak ends when the wager has advanced to a maximum level. In another embodiment, the streak may continue indefinitely until a losing outcome occurs. Therefore, once the streak reaches the highest allowable level, it stalls while the player continues to be paid at the highest level for each successive wining outcome until a terminating outcome occurs.

In one embodiment, as applied to Blackjack, the streak status may be affected serially by split hand outcomes, as described above. In one embodiment, the streak status is affected by the totality of split hand results. For example, for purposes of the streak condition: (a) losing all split hands terminates the streak; (b) wining all split hands terminates the streak; and (c) all other combinations of split hand outcomes result in continuation of the streak without any advancement.

In one embodiment, as applied to a Blackjack game, the streak status is placed on hold or suspended if the player chooses to double-down on his or her hand. Therefore, the subsequent result of the double-down hand does not affect the streak. In one such embodiment, wager limits are in place to require that all primary game wagers be greater than or equal to the largest supplemental game wager.

In an embodiment, a first player can place a secondary or streak wager based on another player's outcomes, as described above. In this embodiment, the first player must be a player that is actively participating in the base game. Another embodiment includes cross-player wagering where the player placing the side bet is not the player playing the base game. For example, the player may be logged on or otherwise accessing the game system and is able to place streak wagers on one or more players that are actively participating in the base game. In this example, the player placing the side bet is able to determine, through information provided by the game system 100, the streak levels for the various active base game 200 players and decide which player to wager on. This concept is somewhat similar to horse racing where a player bets on which player they think will be the luckiest. For networked embodiments implemented, for example, via the internet, the game system includes one or displays to display information about the players. The information includes, but is not limited to, a player's prior play history, results of prior side bets placed and their outcomes, and other suitable game play or statistical information.

In one embodiment (not shown) the player places a supplemental wager of a defined amount into a supplemental wager holding area. Upon a signal from the dealer or game system, all supplemental wagers that were placed in a wager holding area are transported to a supplemental wager holding area. In one example, this is accomplished through the use of gravity whereby the supplemental wager is a chip or coin or other suitable gaming token that falls through to the holding table. Upon such a wager being accepted by the game system, a corresponding bet indicator indicates the acceptance of such wager. If the streak advances per the rules of streak advancement described above, the indicator changes to indicate said advancement. Similarly, if the streak terminates, suspends or continues per the rules of streak advancement described above, the indicator likewise indicates such state and status.

It should be appreciated other embodiments can be based on base games other than traditional Blackjack, including, but not limited to, novelty Blackjack games like Power Blackjack or Spanish 21. It should be appreciated other embodiments can be based on base card games other than Blackjack, including, but not limited to, games like Three Card Poker and Casino War. It should be appreciated other embodiments can be based on base games other than card games, including, but not limited to, games like Pai Gow (tiles) or craps.

Electronic Embodiments

In one embodiment, some or all of the elements of the card game system 100 and game 200 described above (collectively referred to as "card system elements") have a video, simulated, animated or virtual form, where such elements are formed by computerized graphical representations of actual physical objects. In such embodiment, the card system elements may be implemented in various configurations for gaming machines or gaming devices, including, but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

It should be appreciated that other embodiments of the card system elements can be played remotely from the gaming establishment, such as games played on a personal computer, personal digital assistant (PDA), cellular phone, or other internet access device. In these embodiments, the user installs a program on the computer or other digital device and is able to play the game remotely. Alternatively, the player is not required to install a program and may simply play the game over or through the internet or other network by accessing one or more online applications of the gaming system using a suitable internet access device.

Figure 16A:
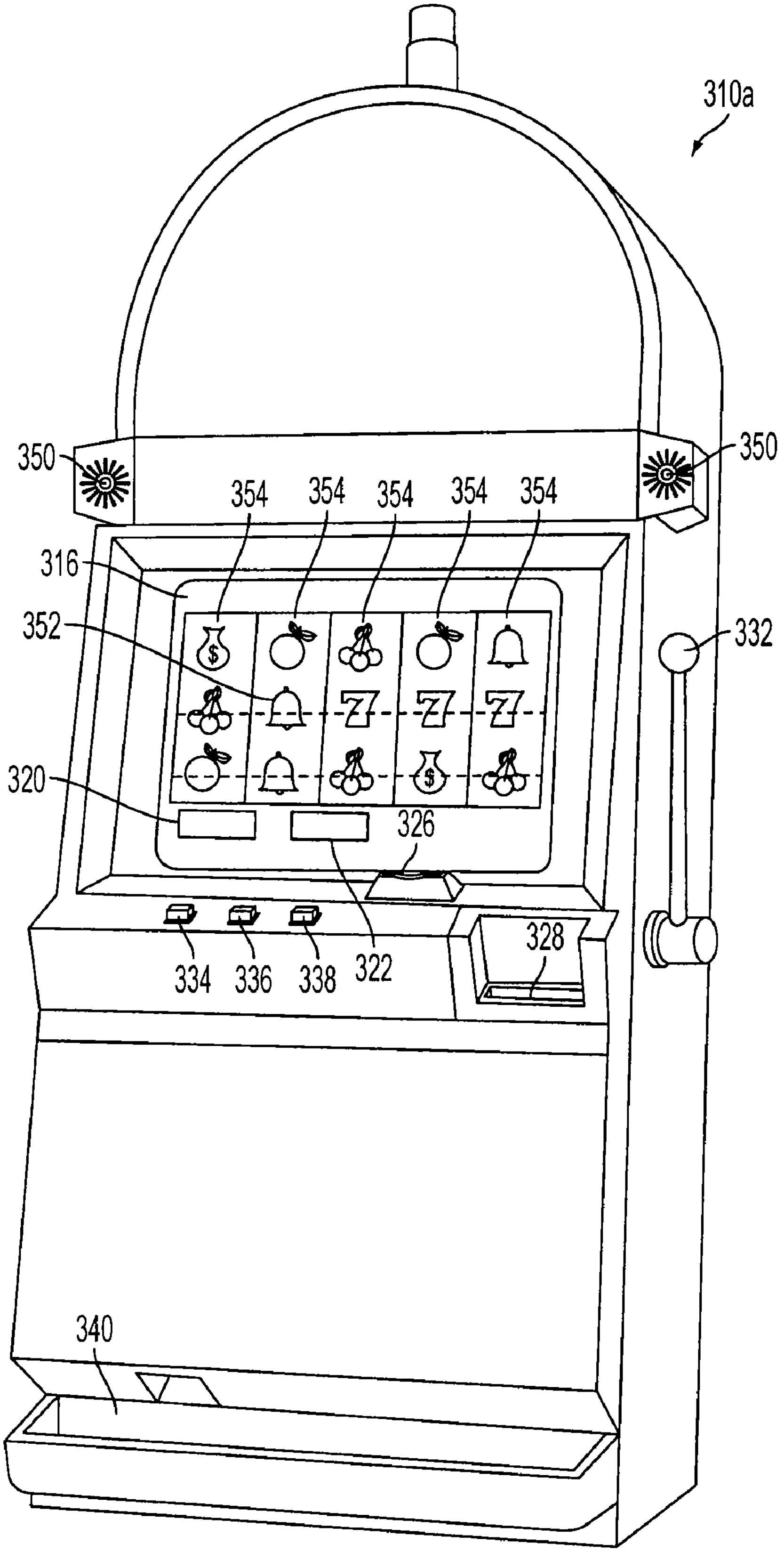
FIG. 16A is a front perspective view of one embodiment of the gaming device, where the game is a slot game.
Figure 16B:
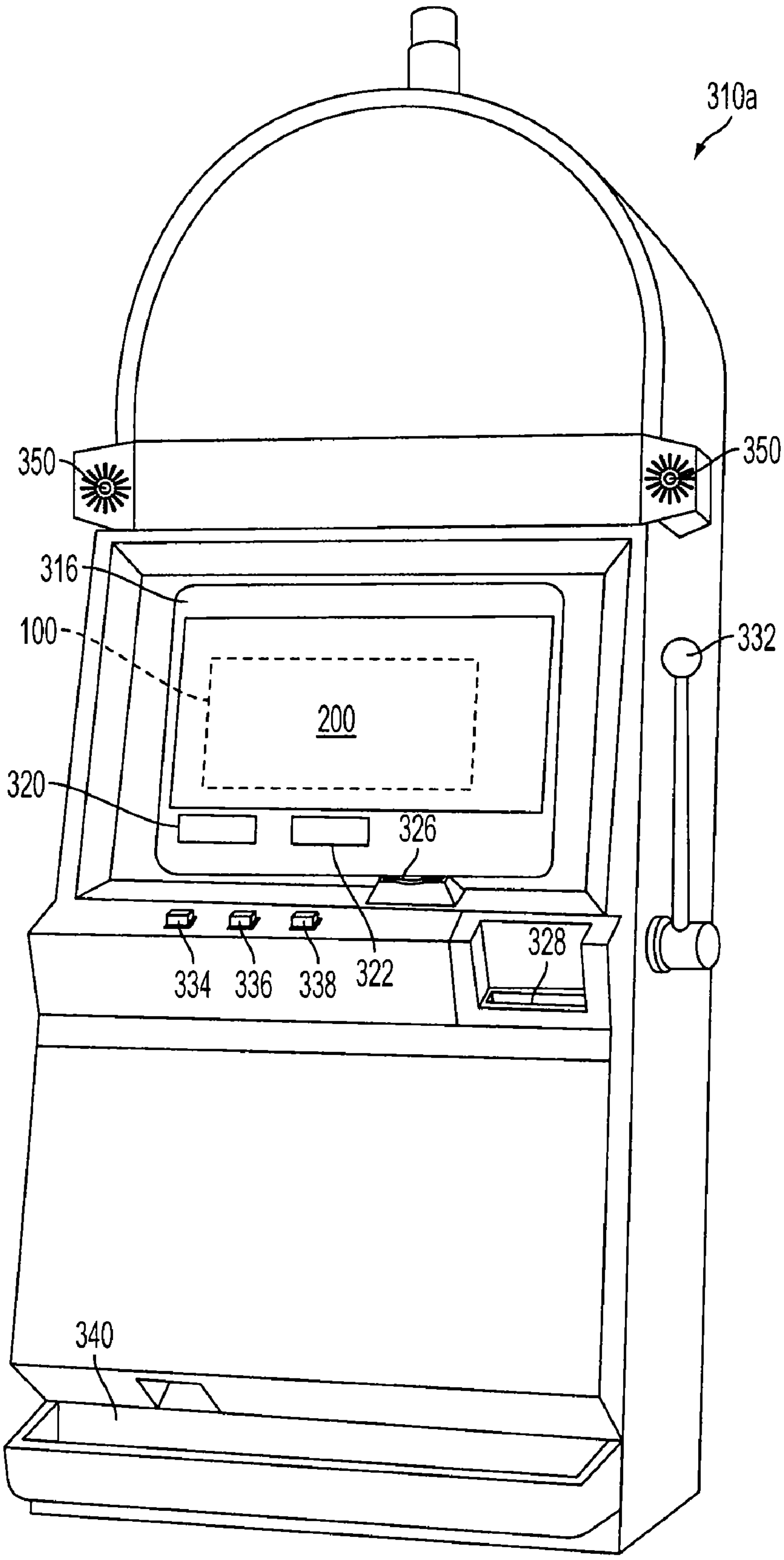
FIG. 16B is a front perspective view of one embodiment of the gaming device, where the game is a modified Blackjack game.

Two example alternative embodiments of a gaming device which implements the card system elements are illustrated in FIGS. 16A, 16B and 16 as gaming device 310*a* and gaming device 310*b*, respectively. Gaming device 310*a* and/or gaming device 310*b* are generally referred to herein as gaming device 310.

Figure 17:
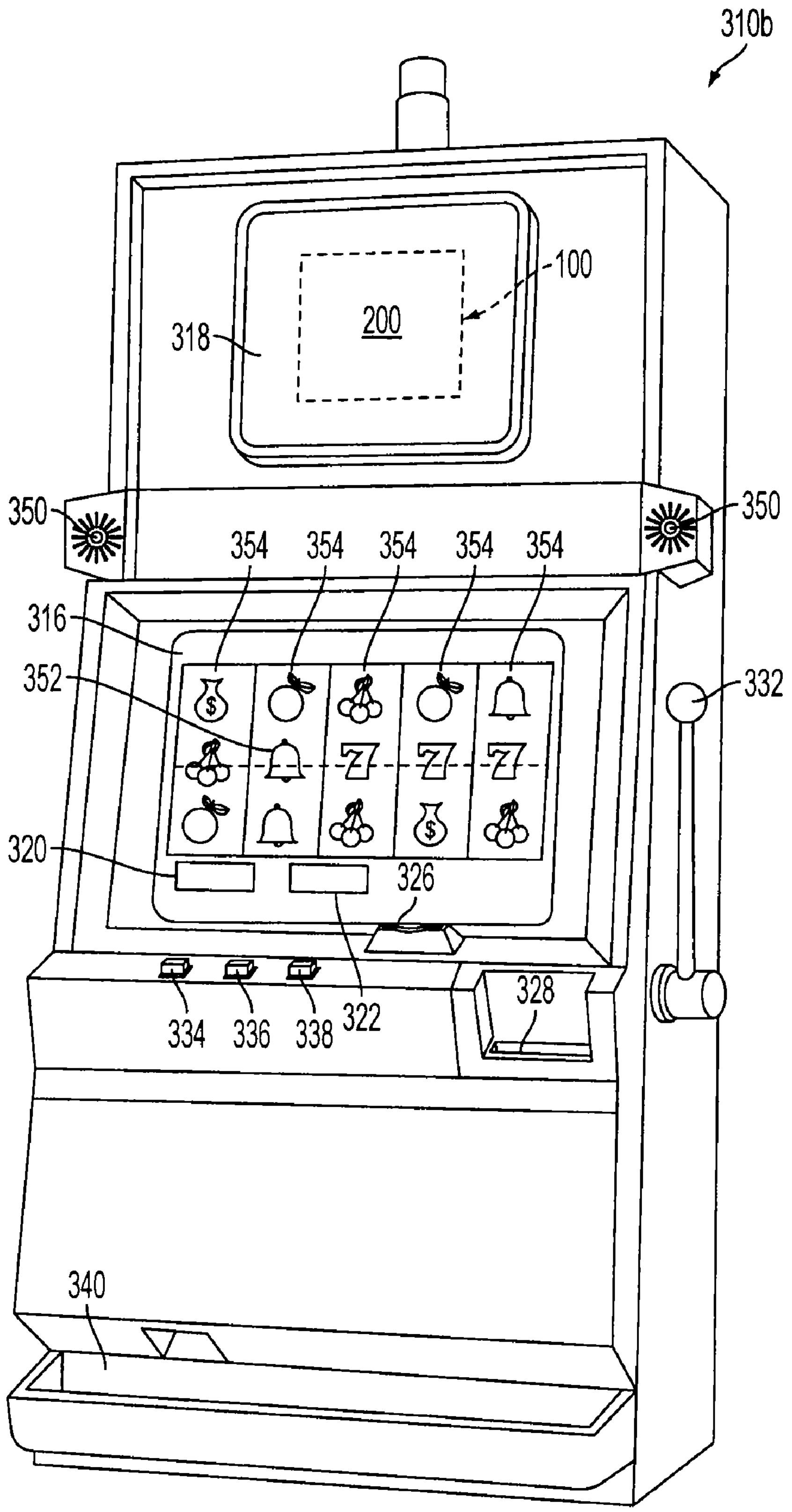
FIG. 17 is a front perspective view of another embodiment of the gaming device, where the game is a modified Blackjack game.

In the embodiments illustrated in FIGS. 16A, 16B and 17, gaming device 310 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 16A, 16B and 17, the gaming device may have varying cabinet and display configurations.

Figure 18:
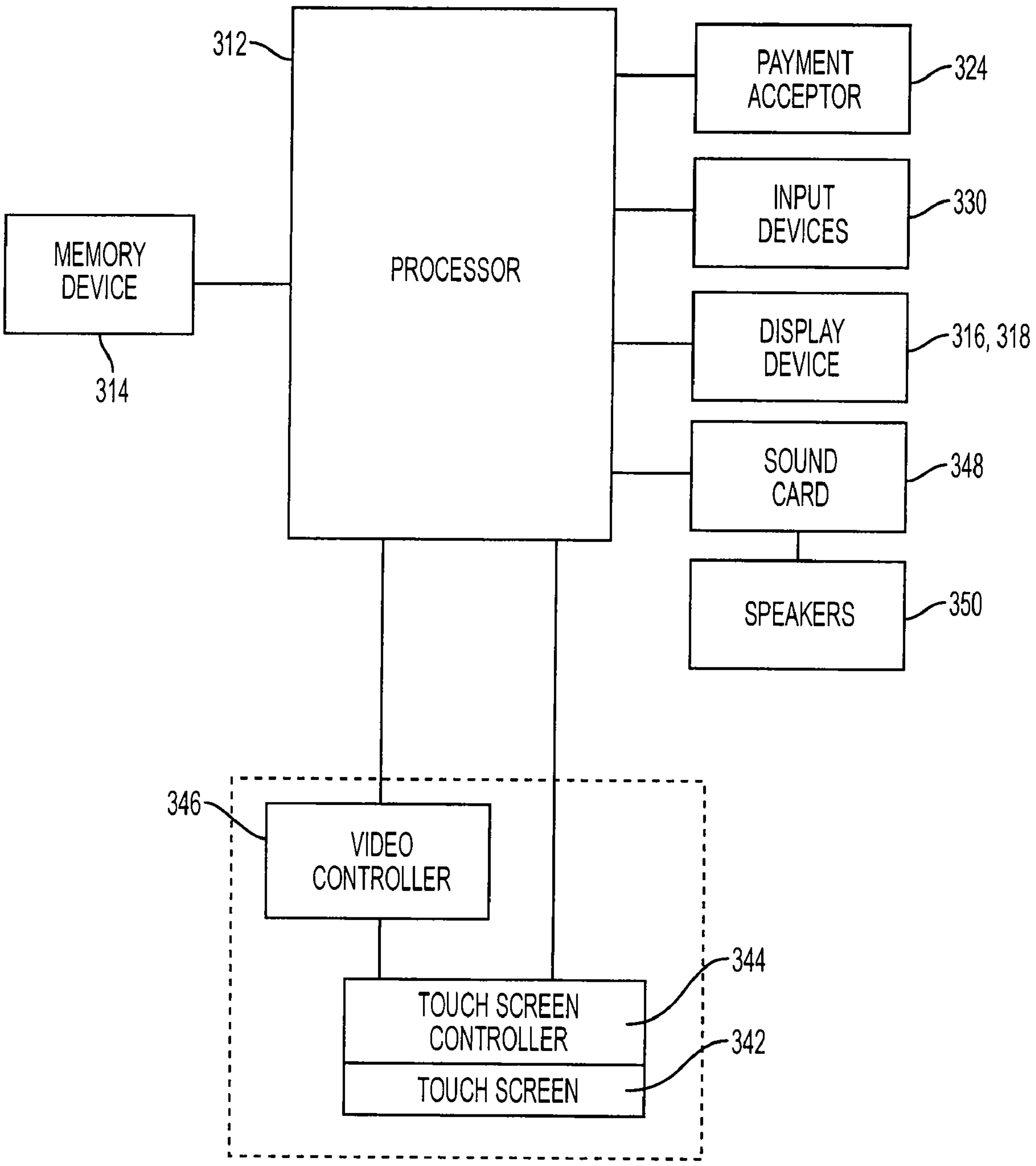
FIG. 18 is a schematic view of another electronic configuration of one embodiment of the gaming device.

In one embodiment, as illustrated in FIG. 18, the gaming device preferably includes at least one processor 312, such as a microprocessor, a microcontroller-based platform, a suitable integrated circuit or one or more application-specific integrated circuits (ASIC's). The processor is in communication with or operable to access or to exchange signals with at least one data storage or memory device 314. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game logic that relate to the play of the gaming device, and stores computer-readable logic, data and instructions of the card game system 100 (see also, FIG. 1). In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as described in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as described in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as described below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIGS. 18, the gaming device includes one or more display devices controlled by the processor. The display devices are preferably connected to or mounted to the cabinet of the gaming device. The embodiment shown in FIG. 15 includes a central display device 316 which displays a primary game. This display device may also display any suitable secondary game associated with the primary game as well as information relating to the primary or secondary game. The alternative embodiment shown in FIG. 17 includes a central display device 316 and an upper display device 318. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 16A, 16B and 17, in one embodiment, the gaming device includes a credit display 320 which displays a player's current number of credits, cash, account balance or the equivalent. In one embodiment, gaming device includes a bet display 322 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 18, in one embodiment, the gaming device includes at least one payment acceptor 324 in communication with the processor. As seen in FIGS. 16A, 16B and 17, the payment acceptor may include a coin slot 326 and a payment, note or bill acceptor 328, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 16A, 16B, 17 and 18, in one embodiment the gaming device includes at least one and preferably a plurality of input devices 330 in communication with the processor. The input devices can include any suitable device which enables the player to produce an input signal which is received by the processor. In one embodiment, after appropriate funding of the gaming device, the input device is a game activation device, such as a pull arm 332 or a play button 334 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 16A, 16B and 17, one input device is a bet one button 336. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 338. The player may push the cash out button and cash out to receive a cash payment or other suitable form of payment corresponding to the number of remaining credits. In one embodiment, when the player cashes out, the player receives the coins or tokens in a coin payout tray 340. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 18, one input device is a touch-screen 342 coupled with a touch-screen controller 344, or some other touch-sensitive display overlay to allow for player interaction with the images on the display. The touch-screen and the touch-screen controller are connected to a video controller 346. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 18, the gaming device includes a sound generating device controlled by one or more sounds cards 348 which function in conjunction with the processor. In one embodiment, the sound generating device includes at least one and preferably a plurality of speakers 350 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In addition to incorporating the game system elements for the system 200 and the related bonus sequence, gaming device 310 can incorporate any ancillary wagering game. The ancillary wagering game can be incorporated into the primary wheel game described above, the bonus sequence described above or a combination thereof. The gaming machine or device may include some or all of the features of conventional gaming machines or devices. The ancillary game may comprise any suitable reel-type game, a card game (other than game 200), a cascading or falling symbol game, a number game or any other game of chance susceptible to representation in an electronic or electromechanical form, which in one embodiment produces a random outcome based on probability data at the time of or after placement of a wager. That is, different wagering games, such as video poker games, video keno, video bingo or any other suitable game may be implemented.

As illustrated in FIG. 16A, in one embodiment, the primary game of gaming device 310*a* is a slot game. Upon the occurrence of a suitable bonus trigger in such primary game, the gaming device 310*a* displays the game 200 illustrated in FIG. 16B. Gaming device 310*b* illustrated in FIG. 17 displays a primary slot game at lower display 316 and game 200 at upper display 318. In either embodiment, the primary slot games illustrated in FIGS. 16A and 17 may be any suitable slot game with one or more paylines 352. The paylines may be horizontal, vertical, circular, diagonal, angled or any combination thereof. In this embodiment, the gaming device includes at least one and preferably a plurality of reels 354, such as three to five reels 354, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 354 are in video form, one or more of the display devices, as described above, display the plurality of simulated video reels 354. Each reel 354 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the ancillary wagering game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player with more ways to win for an equivalent bet or wager on a conventional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, the ancillary wagering game may be a poker game wherein the gaming device enables the player to play a conventional game of video draw poker and initially deals five cards all face-up from a virtual deck of fifty-two card deck. Cards may be dealt as in a conventional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the ancillary wagering game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, the ancillary wagering game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, the game 200 includes a bonus sequence and may give players the opportunity to win credits in an ancillary bonus or secondary game or ancillary bonus or secondary round. The ancillary bonus or secondary game enables the player to obtain a prize or payout in addition to the prize or payout, if any, obtained from the base or primary game. Depending on the embodiment, the game 200 can be the base or primary game of the gaming device, or the game 200 could be the bonus game of the gaming device. In general, the ancillary bonus or secondary game produces a significantly higher level of player excitement than the base or primary game because it provides a greater expectation of winning than the base or primary game and is accompanied with more attractive or unusual features than the base or primary game. In one embodiment, the ancillary bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game. In other embodiments, the triggering event or qualifying condition may be by exceeding a certain amount of game play (such as number of games, number of credits, amount of time), or reaching a specified number of points earned during game play.

In another embodiment, the gaming device processor 312 or central server 356 randomly provides the player one or more plays of one or more ancillary secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play an ancillary secondary game without any explanation or alternatively with simple explanations. In another embodiment, the gaming device (or central server) qualifies a player for an ancillary secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the ancillary bonus game to extend play of the ancillary bonus game.

In one embodiment, no separate entry fee or buy in for an ancillary bonus game need be employed. That is, a player may not purchase an entry into an ancillary bonus game, rather they must win or earn entry through play of the primary game thus, encouraging play of the primary game. In another embodiment, qualification of the ancillary bonus or secondary game is accomplished through a simple "buy in" by the player, for example, if the player has been unsuccessful at qualifying through other specified activities. In another embodiment, the player must make a separate side-wager on the ancillary bonus game or wager a designated amount in the primary game to qualify for the ancillary secondary game. In this embodiment, the ancillary secondary game triggering event must occur and the side-wager (or designated primary game wager amount) must have been placed to trigger the ancillary secondary game.

Figure 19:
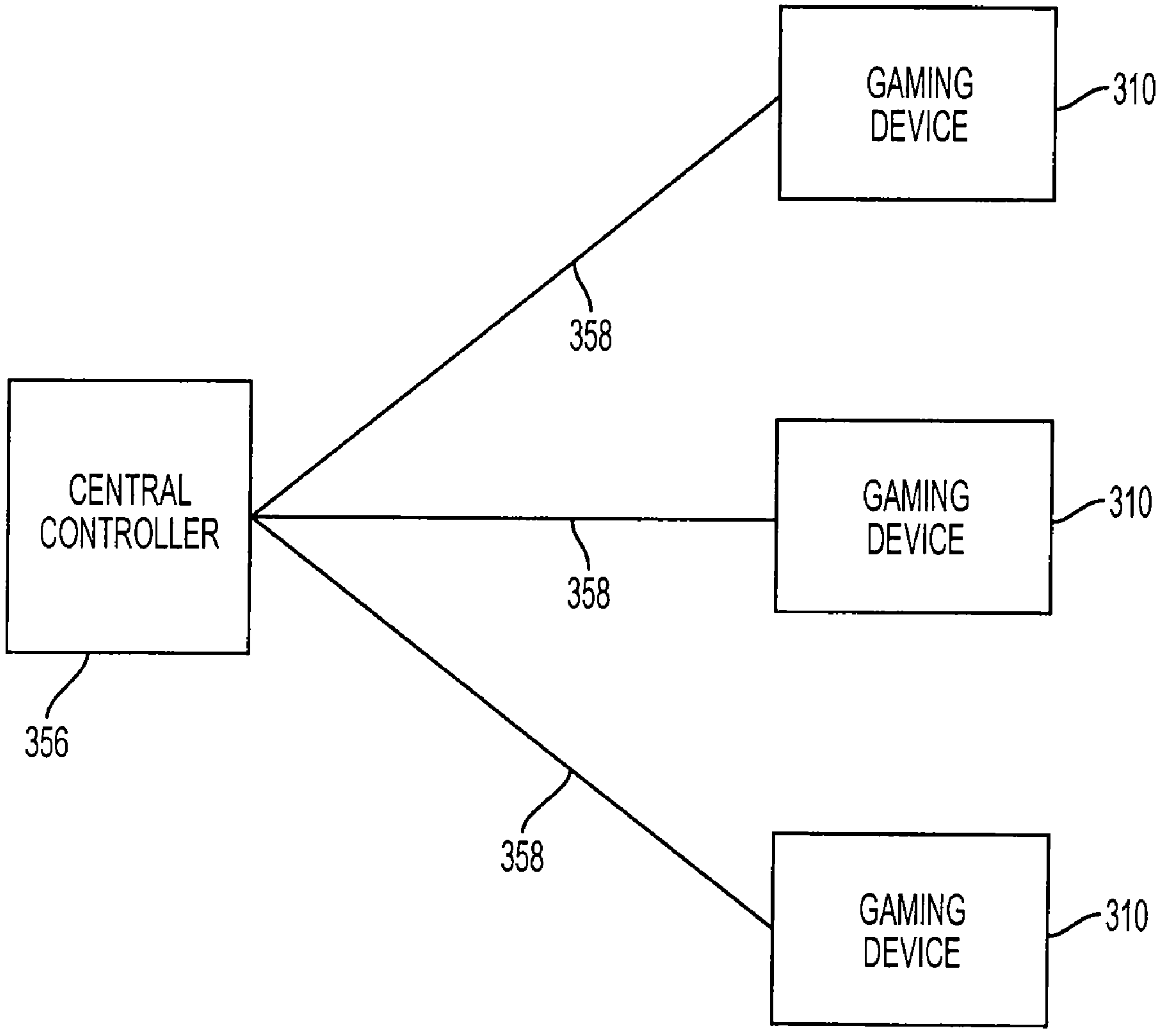
FIG. 19 is a schematic view of a central controller coupled to a plurality of embodiments of the gaming device.

In one embodiment, as illustrated in FIG. 19, one or more of the gaming devices 310 are in communication with each other and/or at least one central server, central controller or remote host 356 through a data network or remote communication link 358. In this embodiment, the central server, central controller or remote host is any suitable server or computing device which includes at least one processor and at least one memory or storage device. In different such embodiments, the central server is a progressive controller or a processor of one of the gaming devices in the game system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome for the game system game of any of the ancillary games described above is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates an ancillary game outcome for the ancillary primary game based on probability data. In another embodiment, the central server or controller randomly generates a game outcome for the secondary game based on probability data. In another embodiment, the central server or controller randomly generates an ancillary game outcome for the primary game, the ancillary secondary game and any ancillary games based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined ancillary game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, an ancillary secondary game outcome, primary, secondary and ancillary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a ball landing on a designated space in a wheel, a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined ancillary game outcome value is determined for each of a plurality of linked or networked gaming devices based on the results of a bingo, keno or lottery game. In this embodiment, each individual gaming device utilizes one or more bingo, keno or lottery games to determine the predetermined ancillary game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary, secondary game or ancillary secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, an ancillary game outcome is determined for each of the enrolled gaming devices based, at least in part, on the selected elements on the provided bingo cards. As described above, the ancillary game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first ancillary game and a second gaming device to have selected elements marked in a different predetermined pattern is provided a second outcome of win $2 which will be provided to a second player regardless of how the second player plays a second ancillary game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined ancillary game outcome may be based on an ancillary award in addition to any award provided for winning the bingo game as described above. In this embodiment, if one or more elements are marked in ancillary patterns within a designated number of drawn elements, an ancillary or intermittent award or value associated with the marked ancillary pattern is provided to the player as part of the predetermined ancillary game outcome. For example, if the four corners of a bingo card are marked within the first twenty selected elements, an ancillary award of $10 is provided to the player as part of the predetermined ancillary game outcome. It should be appreciated that in this embodiment, the player of a gaming device may be provided an ancillary or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the ancillary game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions (including, but not limited to system 200), executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game, an ancillary game or a combination of such games. In another embodiment, the game program may be executable as an ancillary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of ancillary games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

In one embodiment, the gaming system 10 and/or the gaming device 310 includes any one of the embodiments described above. In another embodiment, the gaming system 10 and/or the gaming device 310 includes any suitable combination of such embodiments. In a further embodiment, the gaming system 10 and/or the gaming device 310 includes any suitable combination of one or more portions of such embodiments.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-transitory computer readable medium storing a plurality of instructions which, when executed by at least one processor, cause the at least one processor to:

cause at least one display device to display a plurality of consecutive rounds of play of a card game including a designated pattern of outcomes including a first pattern outcome and a second pattern outcome, wherein each of the outcomes of the designated pattern of outcomes is one of a plurality of different outcomes, wherein each of the consecutive rounds of play:

(a) is playable upon at least one base wager and a single supplemental wager, wherein the single supplemental wager is a streak wager, and (b) results in one of the different outcomes;

provide a base award when, for each of the consecutive rounds of play, said round of play results in a designated one of the different outcomes, wherein the base award is based on said designated one of the different outcomes and said base wager;

provide a first supplemental award when:

(a) a first one of the consecutive rounds of play results in a first round outcome, the first round outcome being one of the different outcomes, and (b) the first round outcome matches the first pattern outcome, wherein the first supplemental award is based on the first round outcome and the single supplemental wager; and provide a second supplemental award when:

(a) a second one of the consecutive rounds of play following the first one of the consecutive rounds of play results in a second round outcome, the second round outcome being one of the different outcomes, and (b) the second round outcome matches the second pattern outcome, wherein the second supplemental award is based on the second round outcome and the single supplemental wager.

2. The non-transitory computer readable medium of claim 1, wherein the card game includes a plurality of base awards, wherein a new round of play of the plurality of consecutive rounds of play begins after one of the base awards is provided.

3. The non-transitory computer readable medium of claim 1, wherein the designated pattern of outcomes is selected from the group consisting of: (a) a chain of winning outcomes; (b) a chain of winning and non-winning outcomes; and (c) a chain of non-terminating outcomes.

4. The non-transitory computer readable medium of claim 1, wherein the card game is a modified version of Blackjack.

5. The non-transitory computer readable medium of claim 1, wherein the first supplemental award and the second supplemental award are unavailable until the single supplemental wager is placed.

6. A non-transitory computer readable medium storing a plurality of instructions which, when executed by at least one processor, cause the at least one processor to:

cause at least one display device to display a plurality of consecutive rounds of play of a card game including a designated pattern of outcomes including a first pattern outcome and a second pattern outcome, wherein each of the outcomes of the designated pattern of outcomes is one of a plurality of different outcomes, wherein each of the consecutive rounds of play:

(a) is playable upon at least one base wager and a plurality of supplemental wagers, wherein the supplemental wagers are streak wagers, and (b) results in one of a plurality of different outcomes;

provide a base award when, for each of the consecutive rounds of play, said round of play results in a designated one of the different outcomes, wherein the base award is based on said designated one of the different outcomes and said base wager;

provide a first supplemental award when:

(a) a first one of the consecutive rounds of play results in a first round outcome, the first round outcome being one of the different outcomes, and (b) the first round outcome matches the first pattern outcome, wherein the first supplemental award is based on the first round outcome and a first one of the supplemental wagers; and provide a second supplemental award when:

(a) a second one of the consecutive rounds of play following the first one of the consecutive rounds of play results in a second round outcome, the second round outcome being one of the different outcomes, and (b) the second round outcome matches the second pattern outcome, wherein the second supplemental award is based on the second round outcome, the first one of the supplemental wagers, and a second one of the supplemental wagers.

7. The non-transitory computer readable medium of claim 6, wherein the card game includes a plurality of base awards, wherein a new round of play of the plurality of consecutive rounds of play begins after one of the base awards is provided.

8. The non-transitory computer readable medium of claim 6, wherein the designated pattern of outcomes is selected from the group consisting of: (a) a chain of winning outcomes; (b) a chain of winning and non-winning outcomes; and (c) a chain of non-terminating outcomes.

9. The non-transitory computer readable medium of claim 6, wherein the card game is a modified version of Blackjack.

10. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

(i) for a first round of play of a plurality of consecutive rounds of play of a card game, each of the rounds of play of the card game resulting in one of a plurality of different outcomes:

(a) display a designated pattern of outcomes including a first pattern outcome and a second pattern outcome, wherein each of said outcomes of the designated pattern of outcomes is one of the different outcomes, (b) receive a first base wager and a first supplemental wager from a player, wherein the first supplemental wager is a streak wager, (c) display the first round of play of the card game, (d) determine an outcome of the first round of play of the card game, said outcome being one of the different outcomes, (e) determine any base award amount associated with said outcome based on said outcome and the first base wager, (f) if said outcome of the first round of play of the card game matches the first pattern outcome, determine a first supplemental award amount associated with said outcome based on said outcome and the first supplemental wager, and (g) provide any determined award amounts to the player, and (ii) for a second round of play of the plurality of consecutive rounds of play of the card game, the second round of play following the first round of play:

(a) display the designated pattern of outcomes, (b) receive a second base wager from the player, (c) display the second round of play of the card game, (d) determine an outcome of the second round of play of the card game, said outcome being one of the different outcomes, (e) determine any base award amount associated with said outcome based on said outcome and the second base wager, (f) if said outcome of the second round of play of the card game matches the second pattern outcome, determine a second supplemental award amount associated with said outcome based on said outcome and the first supplemental wager, and (g) provide any determined award amounts to the player.

11. The gaming device of claim 10, wherein the card game includes a plurality of base award amounts, wherein a new round of play of the plurality of consecutive rounds of play of the card game begins after one of the base award amounts is provided.

12. The gaming device of claim 10, wherein the designated pattern of outcomes is selected from the group consisting of:

(a) a chain of winning outcomes; (b) a chain of winning and non-winning outcomes; and (c) a chain of non-terminating outcomes.

13. The gaming device of claim 10, wherein the card game is a modified version of Blackjack.

14. The gaming device of claim 10, wherein the second supplemental award amount is greater than the first supplemental award amount.

15. A gaming device comprising:

at least one display device;

at least one input device;

at least one processor; and at least one memory device storing a plurality of instructions, wherein the plurality of instructions, when executed by the at least one processor, cause the at least one processor to operate with the at least one display device and the at least one input device to:

(i) for a first round of play of a plurality of consecutive rounds of play of a card game, each of the rounds of play of the card game resulting in one of a plurality of different outcomes:

(a) display a designated pattern of outcomes including a first pattern outcome and a second pattern outcome, wherein each of said outcomes of the designated pattern of outcomes is one of the different outcomes, (b) receive a first base wager and a first supplemental wager from a player, wherein the first supplemental wager is a first streak wager, (c) display the first round of play of the card game, (d) determine an outcome of the first round of play of the card game, said outcome being one of the different outcomes, (e) determine any base award amount associated with said outcome based on said outcome and the first base wager, (f) if said outcome of the first round of play of the card game matches the first pattern outcome, determine a first supplemental award amount associated with said outcome based on said outcome and the first supplemental wager, and (g) provide any determined award amounts to the player, and (ii) for a second round of play of the plurality of consecutive rounds of play of the card game, the second round of play following the first round of play:

(a) display the designated pattern of outcomes, (b) receive a second base wager and a second supplemental wager from the player, wherein the second supplemental wager is a second streak wager, (c) display the second round of play of the card game, (d) determine an outcome of the second round of play of the card game, said outcome being one of the different outcomes, (e) determine any base award amount associated with said outcome based on said outcome and the second base wager, (f) if said outcome of the second round of play of the card game matches the second pattern outcome, determine a second supplemental award amount associated with said outcome based on said outcome, the first supplemental wager, and the second supplemental wager, and (g) provide any determined award amounts to the player.

16. The gaming device of claim 15, wherein the card game includes a plurality of base award amounts, wherein a new round of play of the plurality of consecutive rounds of play of the card game begins after one of the base award amounts is provided.

17. The gaming device of claim 15, wherein the designated pattern of outcomes is selected from the group consisting of: (a) a chain of winning outcomes; (b) a chain of winning and non-winning outcomes; and (c) a chain of non-terminating outcomes.

18. The gaming device of claim 15, wherein the card game is a modified version of Blackjack.

19. The gaming device of claim 15, wherein the first supplemental wager and the second supplemental wager are equal.

20. The gaming device of claim 19, wherein the second supplemental award amount is greater than the first supplemental award amount.

21. A method of operating a gaming device, said method comprising:

(i) for a first round of play of a plurality of consecutive rounds of play of a card game, each of the rounds of play of the card game resulting in one of a plurality of different outcomes:

(a) causing at least one processor to operate with at least one display device to display a designated pattern of outcomes including a first pattern outcome and a second pattern outcome, wherein each of said outcomes of the designated pattern of outcomes is one of the different outcomes, (b) causing the at least one processor to operate with at least one input device to receive a first base wager and a first supplemental wager from a player, wherein the first supplemental wager is a streak wager, (c) causing the at least one processor to operate with the at least one display device to display the first round of play of the card game, (d) causing the at least one processor to determine an outcome of the first round of play of the card game, said outcome being one of the different outcomes, (e) causing the at least one processor to determine any base award amount associated with said outcome based on said outcome and the first base wager, (f) if said outcome of the first round of play of the card game matches the first pattern outcome, causing the at least one processor to determine a first supplemental award amount associated with said outcome based on said outcome and the first supplemental wager, and (g) causing the at least one processor to cause any determined award amounts to be provided to the player, and (ii) for a second round of play of the plurality of consecutive rounds of play of the card game, the second round of play following the first round of play:

(a) causing the at least one processor to operate with the at least one display device to display the designated pattern of outcomes, (b) causing the at least one processor to operate with the at least one input device to receive a second base wager from the player, (c) causing the at least one processor to operate with the at least one display device to display the second round of play of the card game, (d) causing the at least one processor to determine an outcome of the second round of play of the card game, said outcome being one of the different outcomes, (e) causing the at least one processor to determine any base award amount associated with said outcome based on said outcome and the second base wager, (f) if said outcome of the second round of play of the card game matches the second pattern outcome, causing the at least one processor to determine a second supplemental award amount associated with said outcome based on said outcome and the first supplemental wager, and (g) causing the at least one processor to cause any determined award amounts to be provided to the player.

22. The method of claim 21, which includes causing the at least one processor to operate with the at least one display device to display a new round of play of the plurality of consecutive rounds of play of the card game after any base award amounts are provided.

23. The method of claim 21, which includes causing the at least one processor to select the designated pattern of outcomes from the group consisting of: (a) a chain of winning outcomes; (b) a chain of winning and non-winning outcomes; and (c) a chain of non-terminating outcomes.

24. A method of operating a gaming device, said method comprising:

(i) for a first round of play of a plurality of consecutive rounds of play of a card game, each of the rounds of play of the card game resulting in one of a plurality of different outcomes:

(a) causing at least one processor to operate with at least one display device to display a designated pattern of outcomes including a first pattern outcome and a second pattern outcome, wherein each of said outcomes of the designated pattern of outcomes is one of the different outcomes, (b) causing the at least one processor to operate with at least one input device to receive a first base wager and a first supplemental wager from a player, wherein the first supplemental wager is a first streak wager, (c) causing the at least one processor to operate with the at least one display device to display the first round of play of the card game, (d) causing the at least one processor to determine an outcome of the first round of play of the card game, said outcome being one of the different outcomes, (e) causing the at least one processor to determine any base award amount associated with said outcome based on said outcome and the first base wager, (f) if said outcome of the first round of play of the card game matches the first pattern outcome, causing the at least one processor to determine a first supplemental award amount associated with said outcome based on said outcome and the first supplemental wager, and (g) causing the at least one processor to cause any determined award amounts to be provided to the player, and (ii) for a second round of play of the plurality of consecutive rounds of play of the card game, the second round of play following the first round of play:

(a) causing the at least one processor to operate with the at least on display device to display the designated pattern of outcomes, (b) causing the at least one processor to operate with the at least one input device to receive a second base wager and a second supplemental wager from the player, wherein the second supplemental wager is a second streak wager, (c) causing the at least one processor to operate with the at least one display device to display the second round of play of the card game, (d) causing the at least one processor to determine an outcome of the second round of play of the card game, said outcome being one of the different outcomes, (e) causing the at least one processor to determine any base award amount associated with said outcome based on said outcome and the second base wager, (f) if said outcome of the second round of play of the card game matches the second pattern outcome, causing the at least one processor to determine a second supplemental award amount associated with said outcome based on said outcome, the first supplemental wager, and the second supplemental wager, and (g) causing the at least one processor to cause any determined award amounts to be provided to the player.

25. The method of claim 24, which includes causing the at least one processor to operate with the at least one display device to display a new round of play of the plurality of consecutive rounds of play of the card game after any base award amounts are provided.

26. The method of claim 24, which includes causing the at least one processor to select the designated pattern of outcomes from the group consisting of: (a) a chain of winning outcomes; (b) a chain of winning and non-winning outcomes; and (c) a chain of non-terminating outcomes.

* * * * *